US008032391B2

(12) United States Patent
Erie et al.

(10) Patent No.: US 8,032,391 B2
(45) Date of Patent: Oct. 4, 2011

(54) DYNAMIC BULK PACKING AND CASING

(75) Inventors: Clinton W. Erie, Adams, MN (US);
Jason S. Lee, Oronoco, MN (US); Ryan T. Paske, Rochester, MN (US); James P. Wilson, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 12/195,781

(22) Filed: Aug. 21, 2008

(65) Prior Publication Data
US 2010/0049537 A1 Feb. 25, 2010

(51) Int. Cl.
*G06Q 10/00* (2006.01)
(52) U.S. Cl. ......................................................... 705/1.1
(58) Field of Classification Search .................. None
See application file for complete search history.

(56) References Cited

U.S. PATENT DOCUMENTS

| | | | |
|---|---|---|---|
| 5,015,145 A | 5/1991 | Angell et al. | |
| 5,501,571 A | 3/1996 | Van Durrett et al. | |
| 5,884,238 A | 3/1999 | Noll et al. | |
| 6,425,226 B1 * | 7/2002 | Kirschner | 53/445 |
| 6,721,762 B1 | 4/2004 | Levine et al. | |
| 7,085,687 B2 * | 8/2006 | Eckenwiler et al. | 703/1 |
| 7,269,474 B1 * | 9/2007 | Knipfer et al. | 700/219 |
| 2006/0218058 A1 * | 9/2006 | Wojcik et al. | 705/28 |
| 2009/0216366 A1 * | 8/2009 | Zuber et al. | 700/215 |
| 2009/0265179 A1 * | 10/2009 | Cunniff et al. | 705/1 |

FOREIGN PATENT DOCUMENTS

JP  2004-075320  3/2004

OTHER PUBLICATIONS world Wastes vol. 41 No. 9, p. 20-31, Sep. 1998.*
Pack Expo 90 planning guide, Packaging, vol. 35, n 12, p. 72, Oct. 1990.*

\* cited by examiner

*Primary Examiner* — John W Hayes
*Assistant Examiner* — George Chen
(74) *Attorney, Agent, or Firm* — Marcia L. Doubet

(57) ABSTRACT

Automated techniques for identifying packaging solutions, where a dynamic, automated decision is made as to whether items are to be bulk packed and/or whether particular containers are to be bulk cased (that is, consolidated within casing such as pallets). Factors considered may comprise customer-specific requests, order destination, type of items, quantity of items, size of items, quantity of grouped orders, size of grouped orders, and so forth. Orders may contain items that are alike as well as items that are different from one another. A particular order or orders may be assembled as the items of the order(s) arrive for packaging, without requiring a fixed timing or sequence of item arrival, thereby providing a dynamic, real-time packaging solution.

16 Claims, 21 Drawing Sheets

FIG. 2
200

| Product Family 210 | Product Type/ID 220 | Single Pack Dimension 230 | Bulk Pack Enabled 240 | Bulk Pack Qty 250 | Bulk Pack Dimension 260 | Lower Limit 270 | Bulk Casing Enabled 280 | Bulk Packed History % 290 | Bulk Cased History % 295 |
|---|---|---|---|---|---|---|---|---|---|
| Widget | W1 | 20x20x40 | N | | | | N | | |
| Widget | W2 | 1x1x1 | Y | 5 | 1x1x5 | 4 | Y | | |
| Widget | W3 | 1x2x2 | Y | 6 | 1x2x12 | 3 | Y | | |
| Server | S1 | 40x40x40 | N | | | | N | | |
| Server | S2 | 10x40x40 | Y | 4 | 40x40x40 | 4 | N | | |
| Fan | F1 | 4x20x20 | N | | | | N | | |
| Fan | F2 | 4x4x4 | Y | 20 | 4x16x20 | 18 | Y | | |

| Product Family | Product Type/ID | Container Type | # of Containers | Units per Container | Order Number |
|---|---|---|---|---|---|
| Widget | W2 | BP | 7 | 5 | 1,2,3 |
| Widget | W2 | SP | 2 | 1 | 3 |
| Widget | W3 | BP | 2 | 6 | 4 |
| Widget | W3 | BP | 1 | 4 | 4 |

Container Table
900

| Container 910 | Length 920 | Width 930 | Height 940 | Weight 950 |
|---|---|---|---|---|
| 1 | 40 | 24 | 12 | 150 |
| 2 | 24 | 12 | 6 | 75 |
| 3 | 24 | 12 | 6 | 90 |

FIG. 10

Case Table

| 1010 | 1020 | 1030 | 1040 | 1050 | 1060 | 1070 | 1080 | 1090 | 1095 |
|---|---|---|---|---|---|---|---|---|---|
| Name | Length | Width | Height | Weight | Max Weight (capacity) | Max Height | Container Type | Container Qty | Feature Code |
| CE | 48 | 40 | 4 | 20 | | 80 | - | - | |
| RP | 40 | 48 | 4 | 20 | 100 | 25 | 3 | 12 | 8A1234 |
| JL | 24 | 40 | 4 | 10 | | 40 | - | - | |
| JW | 24 | 24 | 4 | 7 | | 35 | - | - | 8A5674 |

Case Fill Table
1100

| Entity 1110 | Case # 1120 | Container # 1130 | Location x-y-z 1140 | Name 1150 | Iteration Number 1160 |
|---|---|---|---|---|---|
| ABC 1 | 1 | 1 | 40-24-12 | CE | 1 |
|  |  | 2 | 24-48-6 | CE | 1 |
|  |  | 3 | 24-48-6 | CE | 1 |
| ABC 1 | 1 | 1 | 40-24-12 | JL | 2 |
|  |  | 2 | 12-24-18 | JL | 2 |
|  |  | 3 | 24-24-18 | JL | 2 |

FIG. 17

Case Characteristics Table

| Entity # | Case # | Length | Width | Height | Weight |
|---|---|---|---|---|---|
| 1A56 | A | 24 | 40 | 12 | 192 |
| 1A56 | B | 48 | 40 | 12 | 182 |
| ... | C | ... | ... | ... | ... |
| ... | D | ... | ... | ... | ... |

*1700* *1710* *1720* *1730* *1740* *1750* *1760*

DYNAMIC BULK PACKING AND CASING

BACKGROUND OF THE INVENTION

The present invention relates to process automation, and deals more particularly with automated packing and casing of goods.

In a build-to-order manufacturing environment, there are often orders for items that are available in more than one configuration—that is, in more than one size, weight, and/or dimension. A particular order may include many different items, each of which is available in multiple configurations. This complicates manufacturing processes such as the packaging operation, where a number of choices may be available for packing the order. Additionally, orders may be grouped into so-called "ship entities", where multiple customer orders and/or items are cased together for shipment to the same location. Grouping orders into ship entities may be initiated by customer request or for convenience by the manufacturing facility (for example, to facilitate the shipping process). Rate reductions may also be available when orders are grouped into ship entities.

BRIEF SUMMARY OF THE INVENTION

The present invention is directed to packaging, and more particularly to dynamically determining bulk packing and/or bulk casing strategies. In one embodiment, this comprises dynamically determining a bulk packing strategy for packing a plurality of items for shipment by: dynamically determining the plurality of items for shipment; dynamically determining whether individual ones of the items are candidates for bulk packing by consulting updateable stored information associated with a type of each of the items; and recommending, as the bulk packing strategy, bulk packing for those individual ones of the items which are dynamically determined to be candidates for bulk packing and single packing for those individual ones of the items which are dynamically determined not to be candidates for bulk packing. The updateable stored information may comprise, by way of example, computer-processable rules for determining which of the item types are candidates for bulk packing or a bulk pack enabled indicator associated with the type of each of the items.

In another embodiment, this comprises dynamically determining a bulk casing strategy for casing a plurality of containers for shipment, each of the containers containing at least one item, by: dynamically determining the plurality of containers for shipment; dynamically determining whether individual ones of the containers are candidates for bulk casing by consulting updateable stored information associated with a type of each of the at least one item contained in each of the containers; and recommending, as the bulk casing strategy, bulk casing for those individual ones of the containers which are dynamically determined to be candidates for bulk casing and single casing for those individual ones of the containers which are dynamically determined not to be candidates for bulk casing. The updateable stored information may comprise, by way of example, computer-processable rules for determining whether the at least one item contained in each of the containers is a candidate for bulk casing or a bulk case enabled indicator associated with the type of each of the items. This embodiment may further comprise determining a plurality of potential bulk casing solutions; selecting that one of the potential bulk casing solutions for which a weight factor thereof is greater than the weight factor of the non-selected ones of the potential bulk casing solutions; and the recommended bulk casing strategy then preferably further comprises using the selected one of the potential bulk casing solutions for the bulk casing of those individual ones of the containers which are determined to be candidates for bulk casing. Optionally, these embodiments may be used in combination.

Embodiments of these and other aspects of the present invention may be provided as method, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 2 illustrates a sample table in which bulk packaging information is specified for a number of items;

FIG. 6 illustrates a table containing sample order packaging information for orders that are to be shipped to a particular destination for which a bulk packaging strategy is being determined;

FIG. 9 illustrates a container table that stores information about the various types of containers in which items may be packaged for shipment;

FIG. 10 illustrates a case table that stores information about the various types of cases in which containers may be cased for shipment;

FIG. 11 illustrates a case fill table that stores information about the containers that are to be shipped to a destination for which a bulk packaging solution is being created;

FIG. 17 illustrates a case characteristics table that stores information about the cases selected for shipping orders to a particular destination;

DETAILED DESCRIPTION OF THE INVENTION

Figure 1:
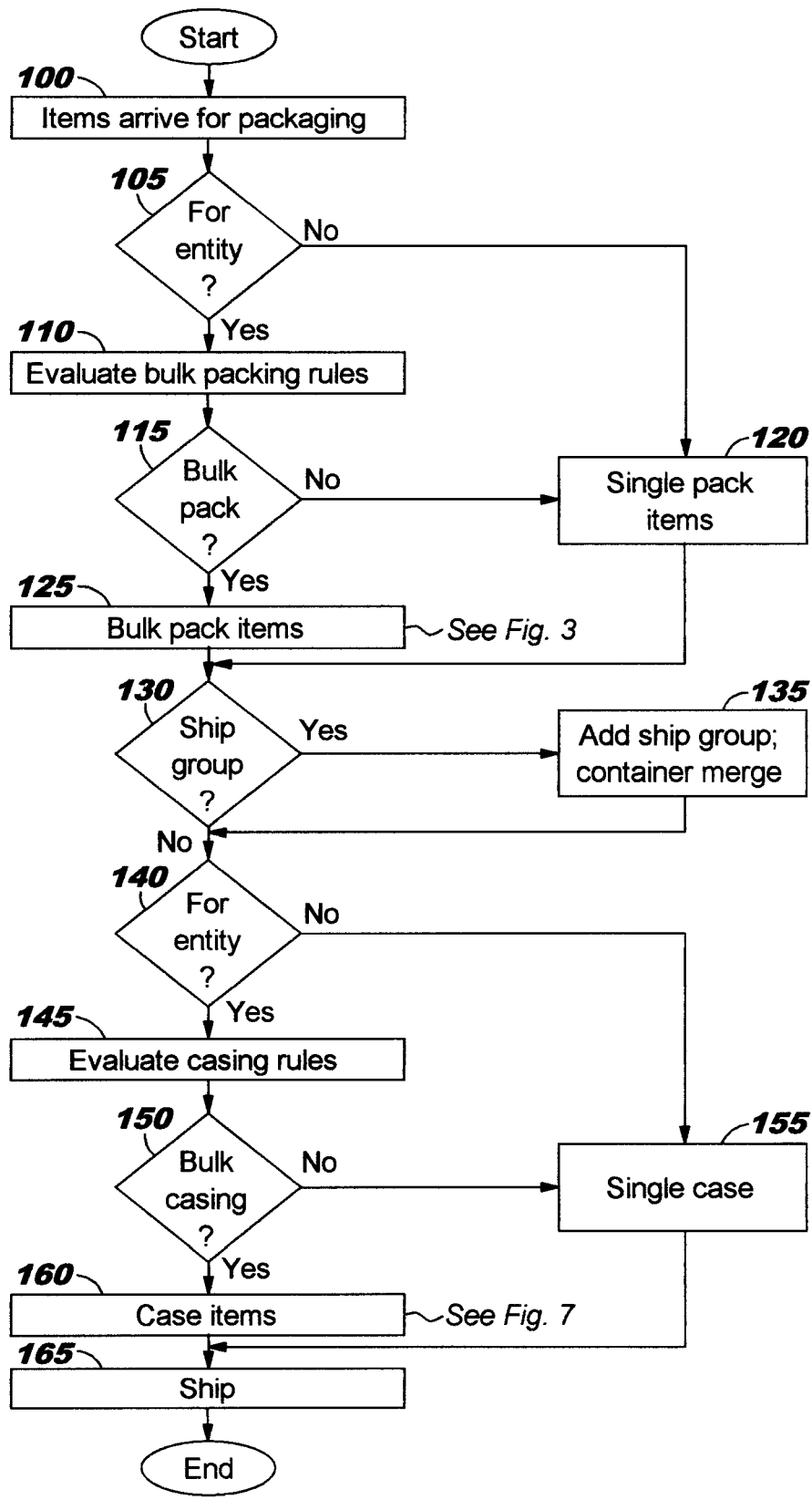
FIG. 1 illustrates a process flow according to an embodiment of the present invention.

Embodiments of the present invention are directed toward automated techniques for identifying packaging solutions, where a dynamic, automated decision is made as to whether items are to be bulk packed and/or whether particular containers are to be bulk cased (that is, consolidated within casing such as pallets). An automated bulk packing and bulk casing strategy is provided using techniques disclosed herein, in view of the content of a particular order or group of orders (e.g., in view of the item quantity, the item size, and/or the item weight). The disclosed techniques are deemed beneficial for orders containing items that are alike as well as for orders containing items that are different from one another.

The term "packaging", as used herein, refers to both packing and casing. In one embodiment, a solution providing the bulk packing decision may be implemented without implementing the disclosed techniques for providing the bulk casing decision. (The terms "bulk casing" and "order consolidation" are used interchangeably herein.) In another embodiment, a solution providing the bulk casing decision may be implemented without implementing the disclosed techniques for a bulk packing determination. In yet another embodiment, a solution may be implemented that provides both of these decisions. While all of these approaches are within the scope of the present invention, discussions hereinafter refer (for ease of reference) primarily to an embodiment implementing both the bulk packing decision and the bulk casing decision.

When orders are to be grouped into ship entities, work direction is required to identify the orders that are to be included in the group and to correctly case the various containers. When rate schedules of the shipper vary, cost savings are often available if the grouping is done according to the shipper's guidelines. Manufacturers currently attempt to manually control order content and order grouping, with relatively little success. In particular, due to the complexity of attempting to determine what order configuration and order grouping will result in the best possible shipping rate, potential cost savings may be reduced or forfeited when using a manual approach. The present inventors know of no automated approach to identifying the best packaging configuration and providing work direction for consolidating items and orders that considers the content of one or more orders in terms of factors such as item type, quantity of items, size of items, quantity of grouped orders, size of grouped orders, and so forth when shipping orders where each individual item may have a unique size, weight, and dimension.

Known approaches to configuring an order for shipment have one or more drawbacks, as will now be discussed.

In one known approach, similar items are bulk-packed in fixed quantities. For example, when shipping fans, it might be customary for 40 fans to be packed together in 1 large box. This approach is common among manufacturers who sell high volumes of identical items.

In another known approach, items are packed individually, and shipped in multiple boxes on the same shipping manifest. This approach is commonly used by manufacturers of relatively low-volume, high-end items.

And as briefly mentioned earlier, a common known approach is for each order to be analyzed manually, and to manually determine the best method of packing that order. This approach is heavily utilized in the direct-fulfillment industry, where orders are highly variable, and relies upon a human operator to decide "on the fly" how to pack each individual order, typically giving the operator carte blanche for selecting a packaging solution. However, semi-skilled operators are needed in this approach, particularly when the goal is distribution of higher-end products and optimization of shipping costs, and such operators add to labor cost and are sometimes not readily available in the labor pool. In addition, it is believed that there is very little chance of reuse for a particular packaging solution created in this manner, due to the high variability among orders. Because of these factors, this approach leads to a relatively high degree of overhead.

An embodiment of the present invention determines a bulk packing and bulk casing strategy based on order characteristics that may comprise one or more of the following factors: customer-specific requests, order destination, type of items, quantity of items, size of items, quantity of grouped orders, and size of grouped orders. As noted earlier, each individual item may have a unique size, weight, and dimension. The disclosed techniques may be used in an environment where a particular order is assembled as the items of that order arrive for packaging, without requiring a fixed timing or sequence of item arrival, thereby providing a dynamic, real-time packaging solution.

An embodiment of the present invention may use a number of parameters which are described herein (by way of illustration but not of limitation) as being stored in data tables. A number of such tables will be described. One table specifies constraints on how particular items may (or may not) be bulk packed, for example. Such constraints may be defined by engineers or other personnel; in another approach, they may be programmatically determined. Selected ones of the tables are used when analyzing characteristics of a particular order and/or group of orders, and a result of the analysis comprises instructions on how the items should be packaged for shipment. These instructions may be provided to operators who are responsible for order packaging, and may include (by way of example) how to route items among packaging locations, what type of container to pack the items in, and how many to pack in one container. The instructions may further comprise whether multiple containers may be consolidated in a particular casing, such as a pallet, and how that casing should be carried out (e.g., how the containers should be placed within the case).

An optional aspect is also disclosed whereby statistics are gathered for the packaging decisions. These statistics may be used for tuning the packaging recommendations, for evaluating cost impacts of the packaging recommendations, and/or for other purposes, as will be discussed in more detail below.

Referring now to FIG. 1, a process flow is depicted according to an embodiment of the present invention. One or more items arrive for packaging (Block 100), and may belong to one or more orders that are to be shipped in a particular ship entity (which may, for example, be destined for a particular customer location or a consolidation center from which orders will be routed to more than one customer location, referred to generally herein as "the destination").

Block 105 asks whether the item(s) is/are part of a ship entity destined for a particular destination for which a packaging decision is being made. Shipments may be sent on a daily basis, in which case the decision is made with regard to shipments that are to be sent to that destination on this particular day. Other shipping frequencies may be used without deviating from the scope of the present invention, however. If the test in Block 105 has a negative result for a particular item, then this item is preferably treated as a single-pack item rather than a bulk-pack candidate; accordingly, control transfers to Block 120 for single packing. When the test in Block 105 has a positive result for a particular item, then Block 110 evaluates bulk packing rules for this item to determine whether it is a candidate for bulk packing. This evaluation will now be discussed with reference to the sample bulk packing information shown in FIG. 2.

FIG. 2 provides a sample table 200 in which bulk packaging information is specified for a number of items. The structure and contents of this table are illustrative but not limiting, and an implementation of the present invention may use less, more, or different information. In this example, table 200 is organized by product family 210, where each family may include more than one type of product. Each product is identified by a product type 220, which is preferably an identifier that distinguishes among different products of the product family. (The terms "product" and "item" are used interchangeably herein.) For each product type, dimensions of this product (i.e., a product of this type) when packed as a single unit are specified at 230. A yes or no indicator 240 is specified for each product type, indicating whether this product can be bulk packed. Indicator 240 is set to "N" for the widget having product type "W1", for example, indicating that this widget should not be bulk packed. This might be because this widget is too heavy, for example, or perhaps because the widget has a shape or configuration that does not lend itself to bulk packing. For those products having indicator 240 set to "Y" (that is, indicating that this product may be bulk packed), columns 250, 260, 270, and 290 specify further information about the bulk packing. A bulk pack quantity 250 is specified, indicating a maximum number of this item that may be bulk packed together. Dimensions 260 for the bulk pack are specified. A lower limit value 270 is specified for products having indicator 240 set to "Y". In an optional aspect of the present invention, a bulk packed history column 290 stores statistics that pertain to the bulk packing recommendations generated for this product. (In one approach, these statistics comprise a running percentage that reflects how often the recommendations are followed, as will be discussed below.)

So, for example, suppose that a particular order includes 1 widget having product type "W1" and 5 widgets having product type "W2". Table 200 indicates that widget W1 must be single packed, and that the "W2" widgets can be bulk packed. See column 240. In particular, all 5 of these "W2" widgets can be packed in 1 container, according to the bulk pack quantity shown in column 250 of table 200.

Although not shown in the example, an embodiment of the present invention may allow customer-specific preferences to override the bulk pack indicator 240. In one approach, a separate table may be created having one or more entries for a customer (or customers), where this separate table specifies an override flag or other override indicator for selected product families and/or product types.

Referring again to FIG. 1, Block 115 tests whether the recommendation that results from the evaluation at Block 110 indicates that a particular item is a candidate for bulk packing. If not, then as indicated at Block 120, the item is sent for single packing. Otherwise, as indicated at Block 125, the item is sent for bulk pack processing. As discussed above with reference to an order having different types of widgets, it may happen that some of the items being evaluated are sent for single packing while other items are sent for bulk packing. Accordingly, both of Blocks 120 and 125, and their corresponding paths in FIG. 1, may be executed in that situation.

Figure 3:
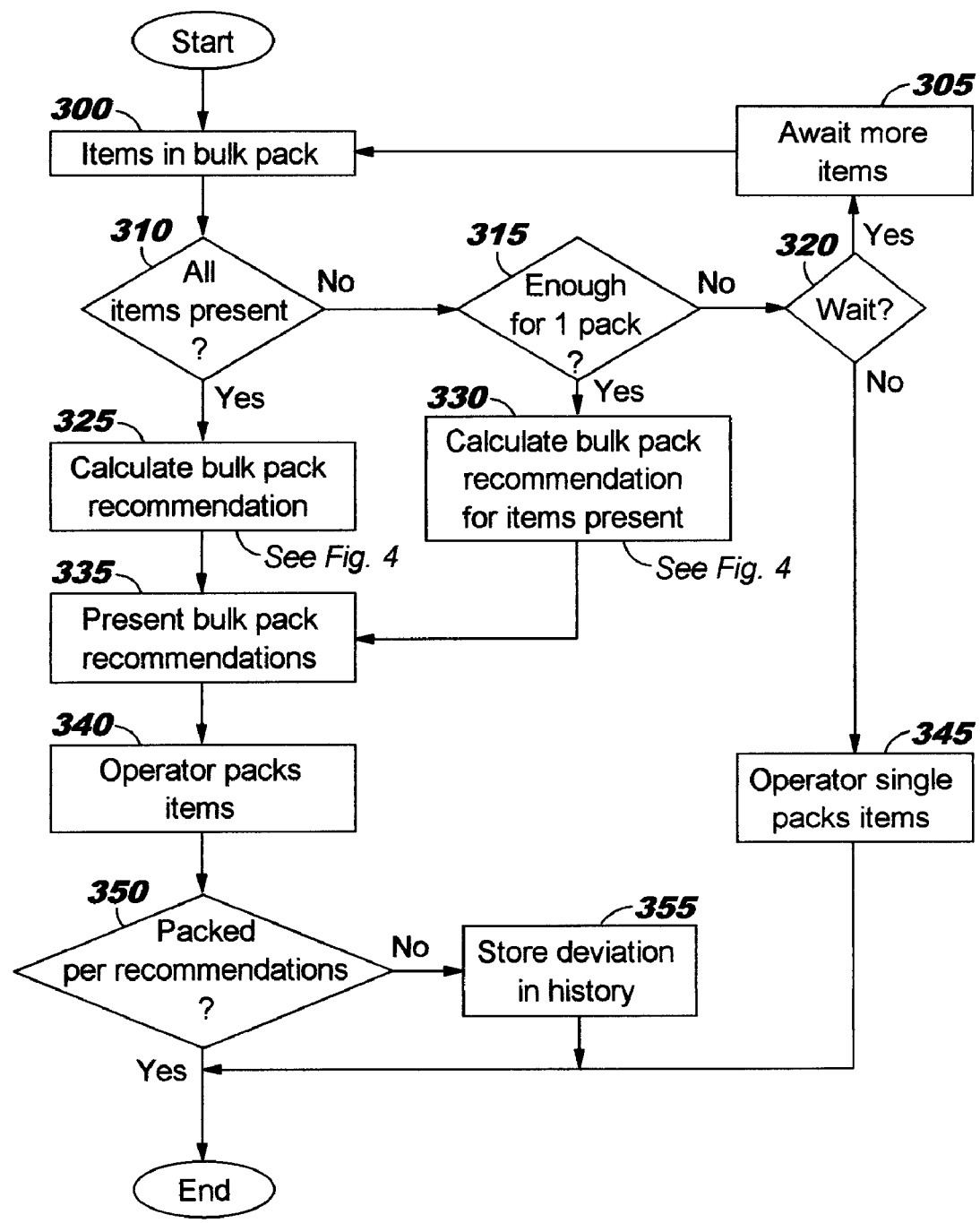
FIG. 3 provides a flowchart depicting logic which may be used when implementing a bulk packing evaluation process.

For the items that are to be sent for bulk packing, Block 125 represents performing a bulk packing evaluation process. A flowchart describing an embodiment of this process is shown in FIG. 3, as will now be discussed.

One or more items arrive at a bulk pack holding area (Block 300). Block 310 tests whether all of the items that are to be sent to the destination are present. This may comprise consulting an order table that lists all orders that are to be sent to the destination on this particular day (or other ship frequency) and each of the items on each of those orders. If the test at Block 310 has a negative result, then Block 315 tests whether there are enough items present for one pack. If the test at Block 315 has a negative result, then Block 320 tests whether the packing should await arrival of additional items. If so, then Block 305 indicates that the packing will await arrival of more items, after which processing continues again from Block 300. When the decision at Block 320 is to not wait, then as shown at Block 345, the operator is preferably requested to single pack these items, after which the processing of FIG. 3 ends with the items being single packed and ready for potential ship-group merge or other activities such as bulk casing analysis and shipment. ("Ship-group merge", as that term is used herein, refers to additions that are made to a packed order prior to shipment, such as adding publications, paperwork, etc.)

When the test at Block 310 has a positive result, indicating that all items to be shipped to the destination are present at the bulk pack holding area, Block 325 calculates a bulk pack recommendation. Similarly, when the test at Block 315 has a positive result, indicating that enough of the items to be shipped to the destination are present at the bulk pack holding area, Block 330 calculates a bulk pack recommendation for those items. For both Blocks 325 and 330, this preferably comprises performing a bulk pack algorithm that consults a table of the type illustrated at 200 in FIG. 2. As contrasted to the check of table 200 at Block 110 of FIG. 1, the calculation performed at Blocks 325 and 330 comprises determining how many of the items to be packed can be packed together, and in what configuration (as discussed in more detail with regard to FIG. 4).

Figure 4:
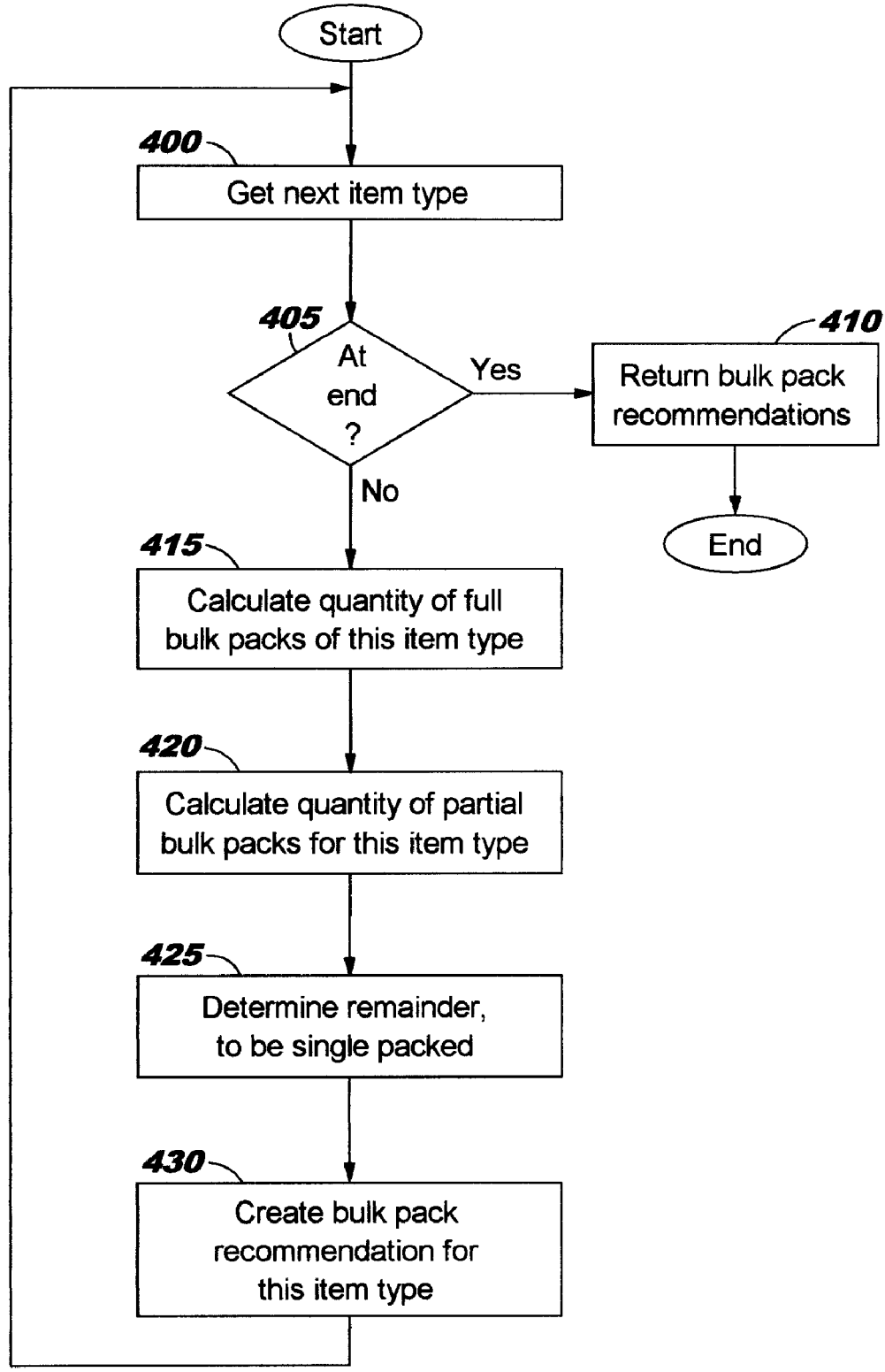
FIG. 4 provides a flowchart depicting logic which may be used when implementing a bulk pack algorithm that makes a bulk pack recommendation for items to be packed.

Referring now to FIG. 4, a bulk pack algorithm that may be used by an embodiment of the present invention for performing the calculations at Blocks 325 and 330 will now be described.

FIG. 4 represents an iterative approach, whereby a bulk pack recommendation is made for each type of item to be packed using the bulk pack process. Accordingly, Block 400 gets the next item type for this iterative processing. If no more item types remain to be evaluated, then the test at Block 405 has a positive result and the bulk pack recommendations created from iterating through the algorithm are returned at Block 410, after which the processing of FIG. 4 ends.

When the test at Block 405 has a negative result, on the other hand, items for another item type are available for evaluating with the bulk pack algorithm. Block 415 therefore calculates how many full bulk packs should be used for the number of items of this product type that are ready to be shipped. Suppose, for example, that 37 widgets having type "W2" are ready for shipping. Column 250 of table 200 indicates that the bulk pack quantity for these widgets is 5 per bulk pack. Block 415 therefore divides 37 by 5, in this example, and determines that 7 full bulk packs can be used with 2 of these widgets left over.

Block 420 then calculates how many partial bulk packs should be used for packing the items that are left over according to Block 415. This preferably comprises dividing the number of left-over items by the lower limit value from column 270 of table 200. For the widgets having type "W2", this lower limit value is specified in column 270 as being set to 4. The lower limit value is intended to convey whether it is preferable to ship some items in a partially-full bulk pack or, instead, whether it is preferable to single pack those items. In the general case, the determination of the lower limit value may be made (for example) in view of the dimensions and/or weight of the bulk pack container and the cost of shipping that container as compared to the dimensions/weight of the individual items and the cost of shipping those items when packed individually. In the example of the type "W2" widgets, column 250 of table 200 indicates that a full bulk pack will hold 5 of these widgets, and thus it may have been determined that it is cost-effective to use a partially-full bulk pack only if there are at least 4 of these widgets to ship, thus setting the lower limit value to 4. In the example where 2 widgets of type "W2" are left over according to Block 415, the calculation at Block 420 therefore returns a value that is less than one. This indicates that no partial bulk packs should be used. Accordingly, 2 widgets are remaining to be packed after the calculation in Block 420.

Block 425 then determines how many items remain that are not to be packed in a full or partial bulk pack. These items are to be recommended for single packing.

In Block 430, a bulk pack recommendation is created for the items of this item type. By way of review, for the "W2" widget example, this recommendation indicates that 7 full bulk packs are recommended, no partial bulk packs are recommended, and 2 of these widgets are recommended to be packed as single-pack items.

Control then returns to Block 400 to get the next item type for iterative processing, if any.

As a second example of the processing of FIG. 4, suppose that there are 16 widgets of type "W3" ready for shipping. Table 200 indicates that the bulk pack quantity for these widgets is 6 (see column 250), and that the lower limit value is 3 (see column 270). Block 415 therefore determines that 2 full bulk packs are recommended; Block 420 then determines that the remaining 4 "W3" widgets can be shipped in a partially-full bulk pack. None of these "W3" widgets is left over for single packing.

Figure 5:
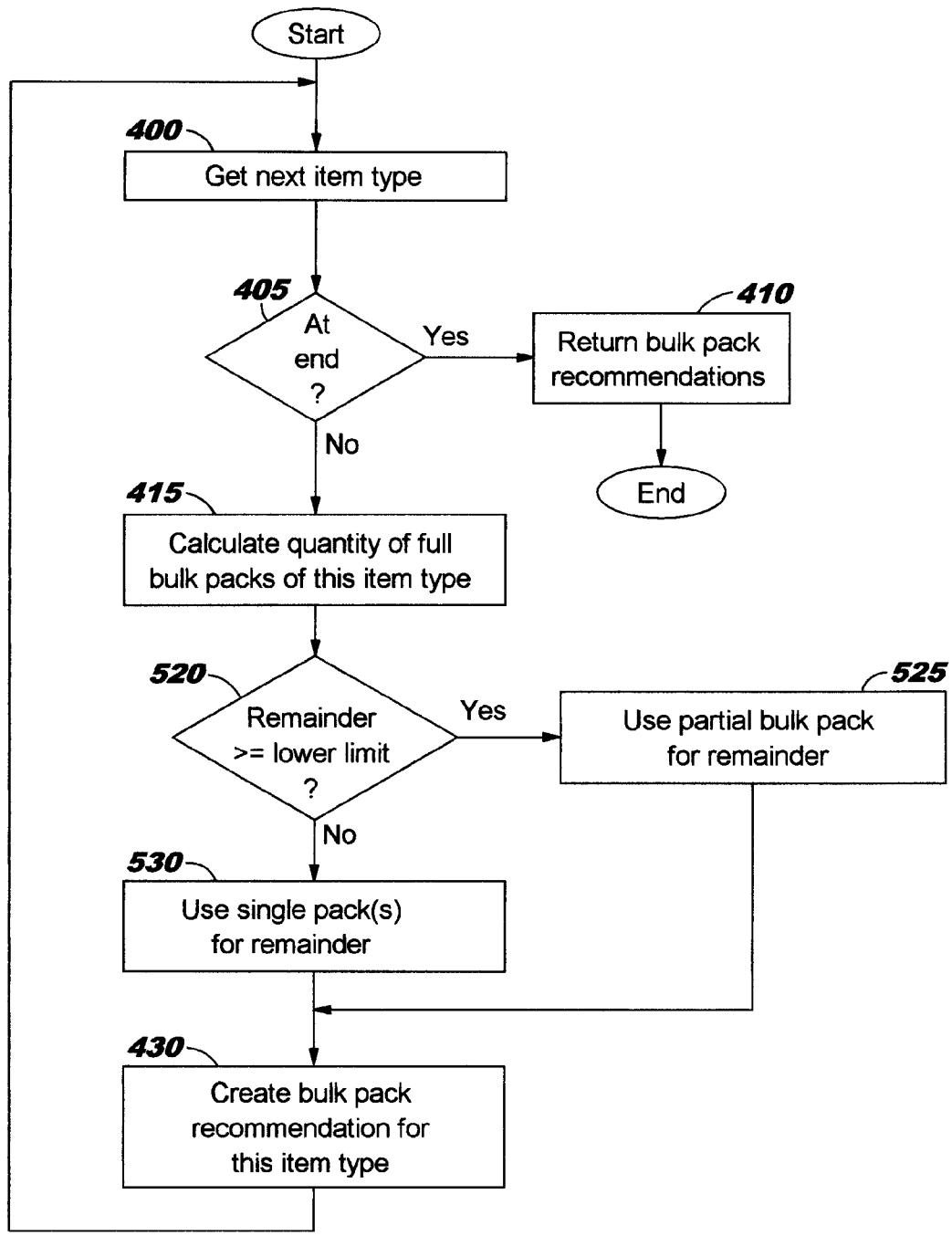
FIG. 5 provides a flowchart depicting logic which may be used when implementing an alternative version of the bulk pack algorithm shown in FIG. 4.

FIG. 5 shows one alternative approach to making the recommendation of how to pack items that are not a full bulk pack. After performing the full bulk pack calculation at Block 415 of FIG. 4, this alternative approach begins at Block 520, which tests whether the remainder is greater than or equal to the lower limit value from column 270. If this test has a positive result, then Block 525 indicates that all of the remainder items are recommended for packing as a partial bulk pack; otherwise, Block 530 indicates that each of these remainder items is recommended for single packing. In either case, processing then continues as described for Block 430 of FIG. 4.

Returning to the discussion of FIG. 3, the recommendations returned from the bulk pack algorithm in FIG. 4 are presented to the operator at Block 335. The operator then packs the items, as indicated at Block 340.

In one embodiment, the processing of FIG. 3 then exits. However, it may happen that the operator is allowed to deviate from the bulk pack recommendations. The operator may be allowed to use his or her own judgement based on experience, for example, to select a different bulk packing strategy. (For example, if the bulk pack algorithm determines that a full bulk pack containing 10 items and a partial bulk pack containing 8 items should be shipped, the operator might decide to put 9 items in each of the bulk packs instead.) When the operator is allowed to override the bulk pack recommendations, an embodiment of the present invention is preferably adapted for testing whether the bulk pack recommendations were followed (Block 350) and for recording deviations in a history file if not (Block 355). Analyzing the deviations is discussed further below, with reference to FIG. 18. The processing of FIG. 3 ends with the items being bulk packed, partial bulk packed, and/or single packed and ready for potential ship-group merge or other activities such as bulk casing analysis and shipment.

Returning again to the discussion of FIG. 1, the bulk packing process represented by Block 125 is now complete. Block 130 tests whether a ship group is required. Typically, this depends on the contents of the order or orders being shipped. If a ship group is required, then at Block 135, the ship group is added, and a container for the ship group may be merged with the packed order. For example, if the customer has ordered electronic equipment, the ship group may comprise power cords that are required for using the equipment, and the container merge then comprises adding a package containing the power cords to the packaging of the order. (Note that Block 135 may also be reached, according to an embodiment of the present invention, after an item is sent for single packing at Block 120. Although not shown in FIG. 1, this path may also include a test such as Block 130.)

Following the processing of Block 135, and also when the test at Block 130 has a negative result, one or more containers are now available for bulk casing analysis. These containers may belong to one or more orders that are to be shipped to a particular destination.

Block 140 asks whether the container(s) is/are part of a ship entity that is destined for the same destination for which a packaging decision is being made. If the test in Block 140 has a negative result for a particular container, then this container is preferably treated as a single-case container rather than a bulk-case candidate; accordingly, control transfers to Block 155 for single casing. When the test in Block 140 has a positive result for a particular container, then Block 145 evaluates container consolidation rules for this container to determine whether it is a candidate for bulk casing. This evaluation will now be discussed with reference to the sample bulk casing information shown in FIG. 2 and sample order packaging information shown in FIG. 6.

Sample table 200 of FIG. 2 was discussed above with regard to bulk packing information specified therein. In addition, table 200 is illustrated as containing information pertaining to an order consolidation strategy that allows casing of multiple containers into a single case (where a case is also referred to herein as a pallet, by way of example). As an alternative to storing bulk packing and bulk casing information in a single table, however, an alternative embodiment may split this information into two (or more) tables.

Referring now to illustrative bulk casing information, a yes or no indicator 280 is specified for each product type in table 200, indicating whether containers holding this product can be bulk cased. Indicator 280 is set to "N" for the fan having product type "F1", for example, indicating that containers holding this fan should not be bulk cased. This might be because this fan is too heavy or too large, for example, or perhaps because the fan is considered fragile. In an optional aspect of the present invention, a bulk cased history column 295 stores statistics that pertain to the bulk casing recommendations generated for containers holding this product.

Although not shown in the example, an embodiment of the present invention may allow customer-specific preferences to override the bulk casing indicator 280. Refer to the discussion of overriding the bulk packing indicator 240, above; the bulk casing indicator 280 may be handled in an analogous manner.

FIG. 6 illustrates a table 600 that may be used to store information pertaining to the orders that are to be shipped to a particular destination for which a bulk packaging strategy is being determined. The structure and contents of this table are illustrative but not limiting, and an implementation of the present invention may use less, more, or different information. In this example, table 600 is organized by product family 610 and product type 620, where these fields are analogous to those which are illustrated in columns 210 and 220 of table 200. Table 600 further specifies a container type 630 in which items of this type are packed (or are planned to be packed) for shipping, a quantity 640 of those containers, and a number of units 650 in each of those containers. In this example, the values shown for the container type field 630 are "BP" for bulk pack and "SP" for single pack. One or more order numbers 660 on which the packed items of product type 620 were ordered may also be specified in table 600. Although not shown in the sample table 600, additional information such as a container number or container identifier might be specified as well.

The sample data in table 600 corresponds to the above-discussed examples where 37 widgets of type "W2" and 16 widgets of type "W3" are to be shipped to a particular destination. The bulk packing algorithm determined, for this example, that the recommended packing for the type "W2" widgets was to use 7 full bulk packs, each containing 5 of these widgets, and 2 single packs. The bulk packing algorithm also determined, for the example, that the recommended packing for the type "W3" widgets was to use 2 full bulk packs, each containing 6 of these widgets, and 1 partial bulk pack containing 4 of these widgets. Accordingly, table 600 contains 2 rows for each of these widget types to specify their recommended pack configurations. (The sample data in table 600 indicates that the type "W2" widgets correspond to 3 different orders, whereas the type "W3" widgets all correspond to a single order.)

Referring again to FIG. 1, Block 150 tests whether the recommendation that results from the evaluation at Block 145 indicates that a particular container (which may be a bulk pack or a single pack) is a candidate for bulk casing. If not, then as indicated at Block 155, the container is sent for single palleting or casing. Otherwise, as indicated at Block 160, the container is sent for order consolidation, also referred to herein as bulk casing. It may happen that some of the containers being evaluated are sent for single casing while other containers are sent for bulk casing. Accordingly, both of Blocks 155 and 160, and their corresponding paths in FIG. 1, may be executed in that situation.

Figure 7:
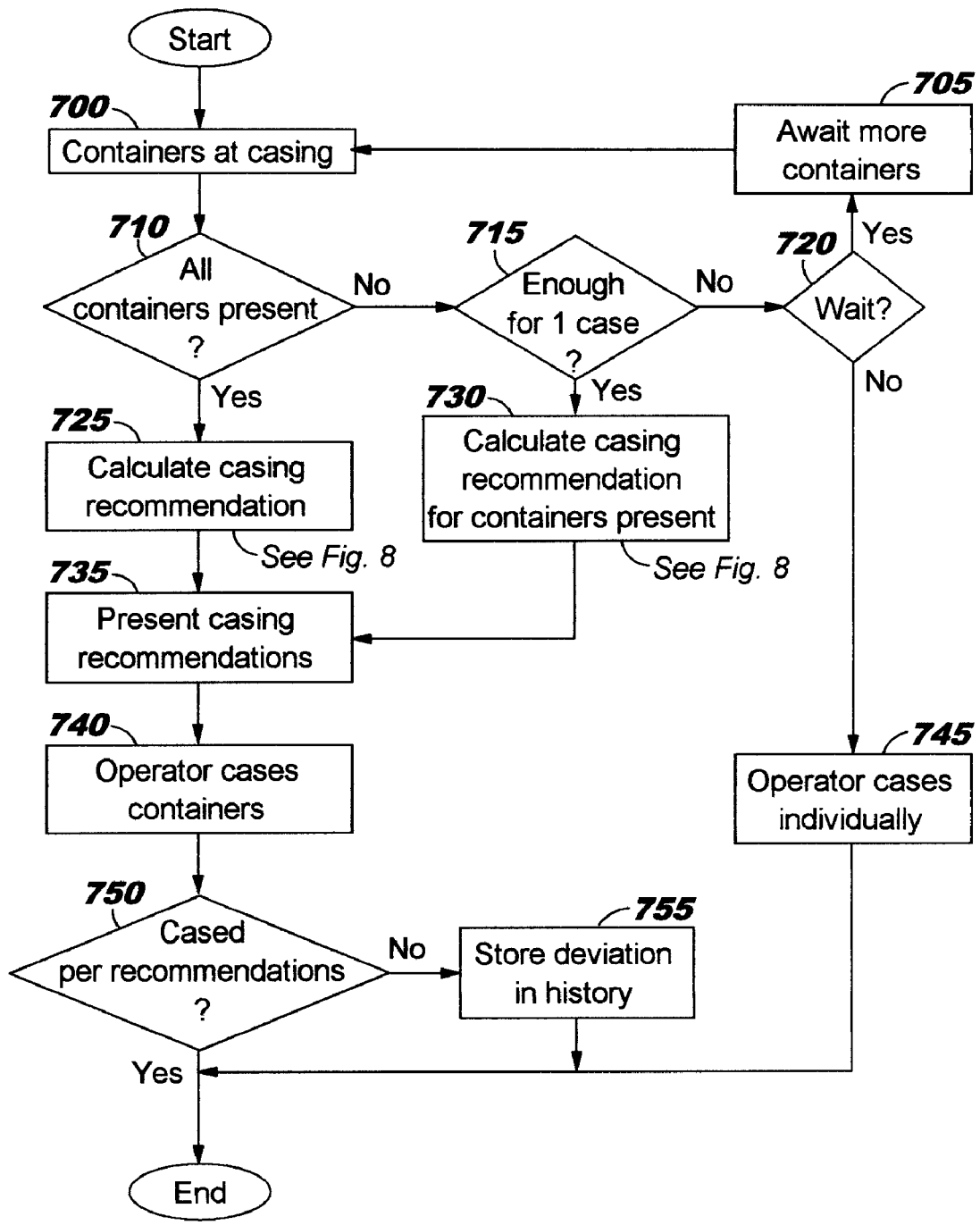
FIG. 7 provides a flowchart depicting logic which may be used when implementing a bulk casing evaluation process.

For the containers that are to be sent for bulk casing, Block 160 represents performing a bulk casing evaluation process. A flowchart describing an embodiment of this process is shown in FIG. 7, as will now be discussed.

One or more containers arrive at a bulk case holding area (Block 700). Block 710 tests whether all of the containers that are to be sent to the destination are present. This may comprise consulting an order table that lists all orders that are to be sent to the destination on this particular day (or other ship frequency) and each of the containers holding items on each of those orders (such as table 600 of FIG. 6). If the test at Block 710 has a negative result, then Block 715 tests whether there are enough containers present for one case. If the test at Block 715 has a negative result, then Block 720 tests whether the casing should await arrival of additional containers. If so, then Block 705 indicates that the casing will await arrival of more containers, after which processing continues again from Block 700. When the decision at Block 720 is to not wait, then as shown at Block 745, the operator is preferably requested to single case these containers, after which the processing of FIG. 7 ends with the containers being single cased and ready for other activities such as shipment.

When the test at Block 710 has a positive result, indicating that all containers to be shipped to the destination are present at the case holding area, Block 725 calculates a bulk casing recommendation. Similarly, when the test at Block 715 has a positive result, indicating that enough of the containers to be shipped to the destination are present at the case holding area, Block 730 calculates a bulk casing recommendation for those containers. For both Blocks 725 and 730, this preferably comprises performing an order consolidation algorithm that comprises determining how many of the containers to be cased can be cased together, and in what configuration. Refer to the discussion of FIGS. 8-15, below, for a description of one embodiment of this order consolidation algorithm.

Figure 8:
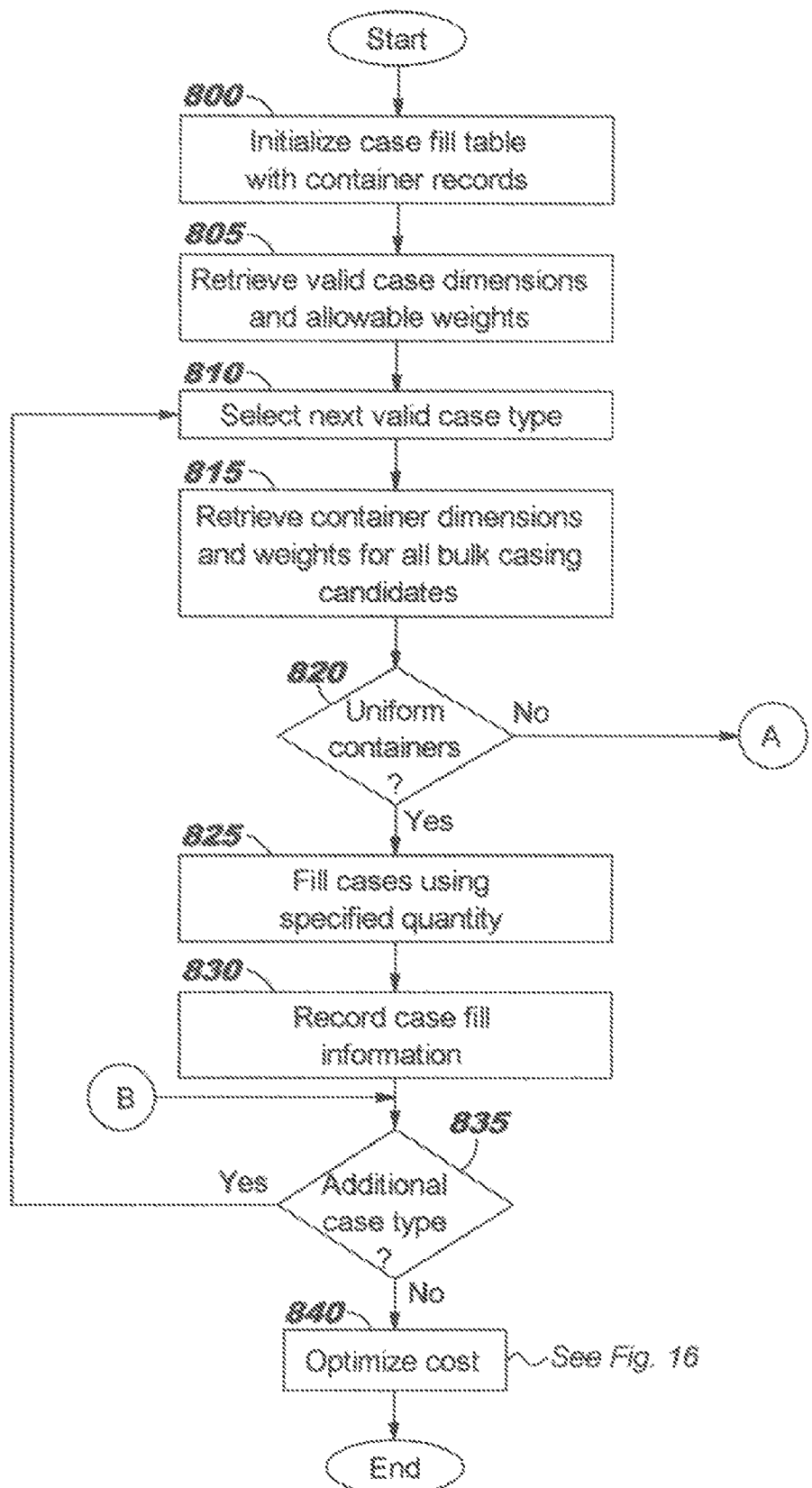
FIGS. 8, 12, 13A-13C, and 14-15 provide flowcharts depicting logic which may be used when implementing an order consolidation algorithm that comprises determining how many containers to be cased can be cased together, and in what configuration.

Upon returning from the order consolidation algorithm processing in FIG. 8, the bulk casing recommendations returned are presented to the operator at Block 735. The operator then cases the containers, as indicated at Block 740. In one embodiment, the processing of FIG. 7 then exits. However, it may happen that the operator is allowed to deviate from the bulk casing recommendations. The operator may be allowed to use his or her own judgement based on experience, for example, to select a different bulk casing strategy. When the operator is allowed to override the bulk casing recommendations, an embodiment of the present invention is preferably adapted for testing whether the bulk casing recommendations were followed (Block 750) and for recording deviations in a history file if not (Block 755). Analyzing the deviations is discussed further below, with reference to FIG. 19. The processing of FIG. 7 ends with the containers being bulk cased, partial bulk cased, and/or single cased and ready for other activities such as shipment.

Returning again to the discussion of FIG. 1, the bulk casing evaluation represented by Block 160 is now complete.

Following the processing of either of Blocks 155 and 160, one or more pallets are now available for shipping. The pallets are therefore shipped (Block 165) to the destination, and the processing of FIG. 1 exits.

An order consolidation algorithm that may be used by an embodiment of the present invention for performing the calculations at Blocks 725 and 730 will now be described with reference to FIGS. 8-15.

When performing the order consolidation algorithm, an embodiment of the present invention may use a number of tables (or other data structures, equivalently) in which information is stored. Sample tables will now be described.

A container table may be used, which stores information about the various types of containers in which items may be packaged for shipment. An example is shown in FIG. 9, where table 900 includes a container identifier 910, a length 920 of this container, a width 930 of this container, a height 940 of this container, and a weight 950 of this container.

A case table 1000 is illustrated in FIG. 10. In the example shown in FIG. 10, table 1000 includes a name or type 1010 for this type of case, a length 1020, a width 1030, a height 1040, a weight 1050 for the case when empty, a maximum weight 1060 for the case when filled, a maximum height 1070 for stacking cases of this type, a container type 1080 that can be bulk packed into this case, a quantity 1090 of those containers, and an optional feature code column 1095. (The feature code may be used to further distinguish among instances of the product type. As one alternative, different product types may be used instead to account for such differences; accordingly, discussions herein are directed toward use of the product type as a distinguisher.)

FIG. 11 illustrates a sample case fill table 1100. In the example shown in FIG. 11, the case fill table 1100 includes a name or identifier 1110 for the destination for which the case is filled, a case number or identifier 1120 for a particular case being filled for that destination, an identifier 1130 of a particular container packed within this case, a location 1140 at which this container is packed within the case, a name or type 1150 of this case, and an iteration number 1160 used when iterating through the order consolidation algorithm.

An embodiment of the order consolidation algorithm will now be described with reference to FIGS. 8-15. (Note that the processing of Blocks 145 and 150 of FIG. 1 determines which containers are, and are not, candidates for bulk casing. Only those containers which are candidates are sent to the bulk casing holding area at Block 160. Accordingly, discussions hereinafter of containers involved in the order consolidation algorithm are to be interpreted as those containers which have already been determined to be bulk casing candidates.) At Block 800, the case fill table (illustrated at 1100 of FIG. 11) is initialized with container records for the containers that are to be shipped to the particular destination for which a bulk packaging solution is being created. This preferably comprises creating a row in case fill table 1100 for each of the containers for this destination, and inserting an identifier of the destination in each of these rows (see column 1110) along with an identifier of the various containers (see column 1130). An iteration number 1160 is initialized to 1 in each of these rows. Remaining fields of these rows will be completed as the algorithm progresses through the current iteration.

Block 805 retrieves the valid case dimensions for each potential case or pallet that may be used for bulk casing, as well as the allowable extents and weights thereof. Case table 1000 of FIG. 10 illustrates one data structure from which such information may be obtained. (Note that while extents are not shown in table 1000, such information may alternatively be specified therein. As another approach, a formula may be used to compute extents when given case dimensions.)

Blocks 810-835 provide an iterative approach to evaluating the available case types, and attempt to optimize bulk casing by case type (even though the container types to be packed in cases may be different). Accordingly, Block 810 selects the next available one of these retrieved case types. For example, the first row from table 1000 may be selected on a first iteration of this logic, corresponding to a container type identified as "CE".

Next, Block 815 retrieves the container dimensions and weights for all containers that are to be shipped to this destination and which are candidates for bulk casing. A list of the containers of interest may be obtained from column 1130 of the rows inserted into case fill table 1100 at Block 800, and the dimensions and weights of those containers may be obtained from container table 900 of FIG. 9 (e.g., by mapping the container identifier 1130 to the container identifier 910).

Block 820 tests whether all of the containers to be shipped are uniform—that is, whether they are of the same container type and can be bulk cased in the same quantity. In one approach, this comprises analyzing all of the containers identified in column 1130 of table 1100 to determine if they have the same dimensions and weights. The container identifiers 1130 may be mapped to container identifier 910 of container table 900 to locate the container dimensions and weights 920-950. In another approach, all of the containers are of the same type if the container identifiers in column 1130 are identical for each row of table 1100. The quantity of this container that may be bulk cased may be determined by mapping the container identifier 1130 from case fill table 1100 to the container type field 1080 in case table 1000, and extracting the container quantity 1090 from the located rows of table 1000. (Note that the bulk case quantity for the containers does not need to be determined if the container types are not uniform.)

Figure 12:
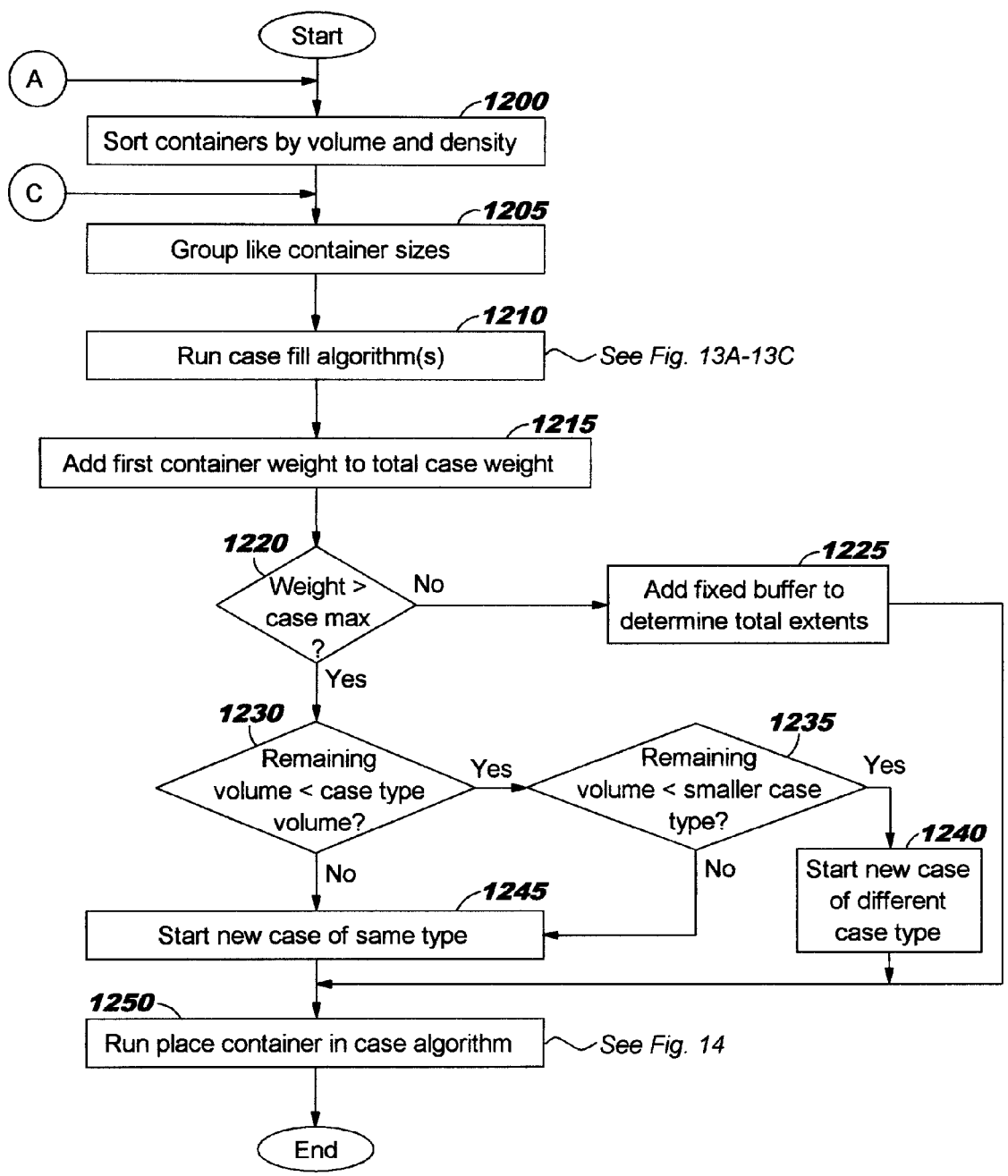

If the test at Block 820 has a positive result, then processing for the uniform containers continues at Block 825; otherwise, processing continues at Block 1200 of FIG. 12.

Block 825 fills one or more cases of the currently-evaluated case type (e.g., the currently-selected case type from table 1000) with containers, according to the quantity value specified in column 1090 of case table 1000 for this case type. (Note that cases are not actually being filled during processing of the order consolidation algorithm; the analysis discussed with regard to FIGS. 8-15 comprises logically filling the cases rather than actually filling them, and iterates through the logical filling process to create one or more potential ways of filling the cases in order to generate a recommendation for actually filling them. The actual filling is performed at Block 740 of FIG. 7.) The number of such cases to be filled is computed by dividing the number of containers indicated in case fill table 1100 (which, in the example table format illustrated in FIG. 11, corresponds to the number of rows of the table which have the current iteration number in column 1160) by the quantity 1090.

Block 830 then records information in the case fill table 1100. Preferably, this comprises inserting a case number in column 1120 of each row having the current iteration number in column 1160 and inserting the identifier of the currently-evaluated case type in column 1150 of each of those rows. For example, if Block 825 determines that 5 of the uniform containers will fit into a single case, then Block 830 inserts an identical case number in column 1120 of the first 5 rows of table 1100 which have the current iteration number. (In the sample data shown in table 1100, the containers are not uniform, and thus the processing at Blocks 825-830 is not performed for this sample data; instead, the processing in FIGS. 12-15 is executed for this sample data.) When the containers to be cased are uniform, it is not strictly necessary to record the 3-dimensional location information shown at column 1140 of table 1100, and this column may therefore be left empty by Block 830.

Block 835 tests whether there is at least one additional case type to be evaluated. If so, then processing continues at Block 810 where the next case type is selected for evaluation; otherwise, all of the potential case types have been evaluated, and information pertaining to each evaluation is stored in case fill table 1100. In this latter case (i.e., when the test at Block 835 has a negative result), Block 840 invokes a shipping cost optimization algorithm, which is described in more detail with reference to FIG. 16. Upon completing the shipping cost optimization algorithm, the processing of FIG. 8 exits.

Referring next to FIG. 12, which is reached from Block 820 when the containers are not uniform, this processing begins at Block 1200 by sorting all of the containers by volume and density. In one approach, this comprises calculating the volume of each container using its dimensions 920, 930, 940 from container table 900, and computing its density by dividing the weight 950 from container table 900 by the calculated volume. In another approach, the volume and density information may be already stored in a table or other data structure.

Block 1205 groups any like-sized containers. Block 1210 then executes one or more case fill algorithms. In one approach, 3 different case fill algorithms are executed (either in serial or in parallel), and results of those iterations will then be compared. This approach attempts to optimize case fill by volume and density, or across cases. Initialization for each of these algorithms will now be described with reference to FIGS. 13A-13C.

Figure 13A:
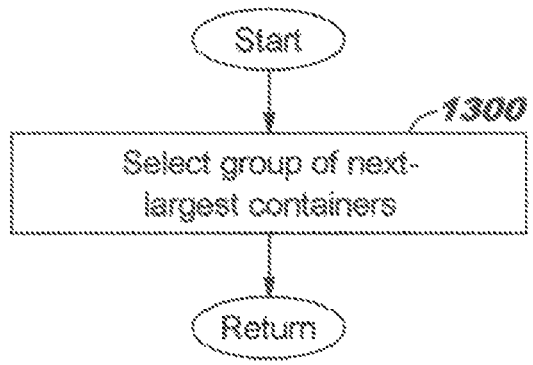

The approach depicted in FIG. 13A comprises selecting the group of next-largest containers at Block 1300—that is, the container group having the most volume from among the grouped containers yet to be evaluated. The processing of FIG. 13A then returns, and the processing at Block 1215 of FIG. 12 is executed using this selected container group.

Figure 13B:
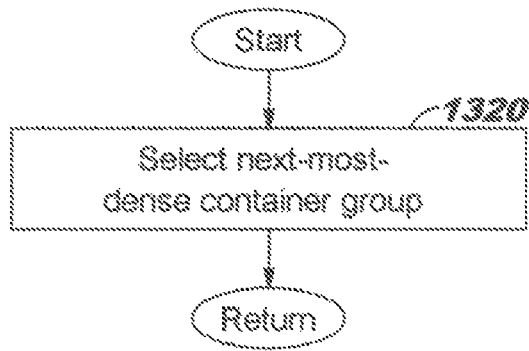

The approach depicted in FIG. 13B comprises selecting the group of next-densest containers at Block 1320—that is, the group of containers having the next-highest density (as determined at Block 1200) from among the grouped containers yet to be evaluated. The processing of FIG. 13B then returns, and the processing at Block 1215 of FIG. 12 is executed using this selected container group.

Figure 13C:
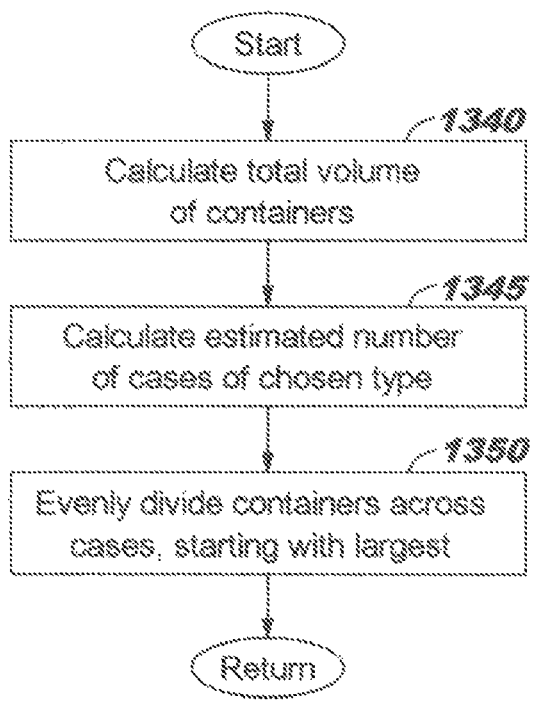

The approach depicted in FIG. 13C comprises first calculating the total volume of all of the containers in the current group (Block 1340). Block 1345 then calculates an estimate of the number of cases that will be needed if using the currently-selected type of case (e.g., the type of case that was selected for evaluation at Block 810 of FIG. 8). This estimate is preferably calculated by dividing the case volume for this type of case by the container volume from Block 1340. The case volume may be computed using the case dimensions 1020, 1030, 1040 from case table 1000 (or in one alternative approach, the case volume may be already stored). Block 1350 then evenly divides the containers across the estimated number of cases from Block 1345, starting with the largest of the containers. The processing of FIG. 13C then returns, and the processing at Block 1215 of FIG. 12 is executed using this selected container group.

Referring again to FIG. 12, the processing which begins at Block 1215 is then executed, for each of the one or more case fill algorithms, using the result of the initialization of the case fill algorithm from the respective one of FIGS. 13A-13C. For ease of illustration, the figures show this processing as a single path. However, it is to be understood that this processing is preferably repeated, with regard to each of the input value returned from each of FIGS. 13A-13C (or from each of a plurality of different initializations, in an alternative embodiment) to generate multiple case fill strategy results that may then be compared.

Accordingly, Block 1215 adds the weight of a first one of the selected containers to a total weight being computed for the case that is currently being evaluated. Block 1220 tests whether the current weight for the case exceeds the case maximum for that case type (which may be found at column 1060 of case table 1000). If not, then Block 1225 adds fixed buffer dimensions to determine the total available extent of the case. These buffer dimensions may be specified as a fixed thickness value, for example, or perhaps as a percentage of the overall size. In one approach, the buffer dimensions for each case type are stored in case table 1000 (not shown in FIG. 10). Processing then continues at Block 1250, which is discussed below.

When the test in Block 1220 has a positive result, this indicates that the current case is full. Blocks 1230-1245 then determine what type of new case should be started. Block 1230 tests whether the remaining volume of containers yet to be cased is less than the volume of the currently-evaluated case type. If so, then processing continues at Block 1235, which checks to see if there is a smaller case type that is big enough to hold the remaining volume of containers. If the test at Block 1235 has a positive result, then Block 1240 indicates that the next case to be started is of a different type than the just-filled case type. In particular, the next case type is preferably selected as the smallest type having a volume larger than the remaining volume of containers. Following Block 1240, processing continues at Block 1250.

When the test at either of Blocks 1230 or 1235 has a negative result, processing continues at Block 1245 where the next case to be started is of the same type as the just-filled case type.

Figure 14:
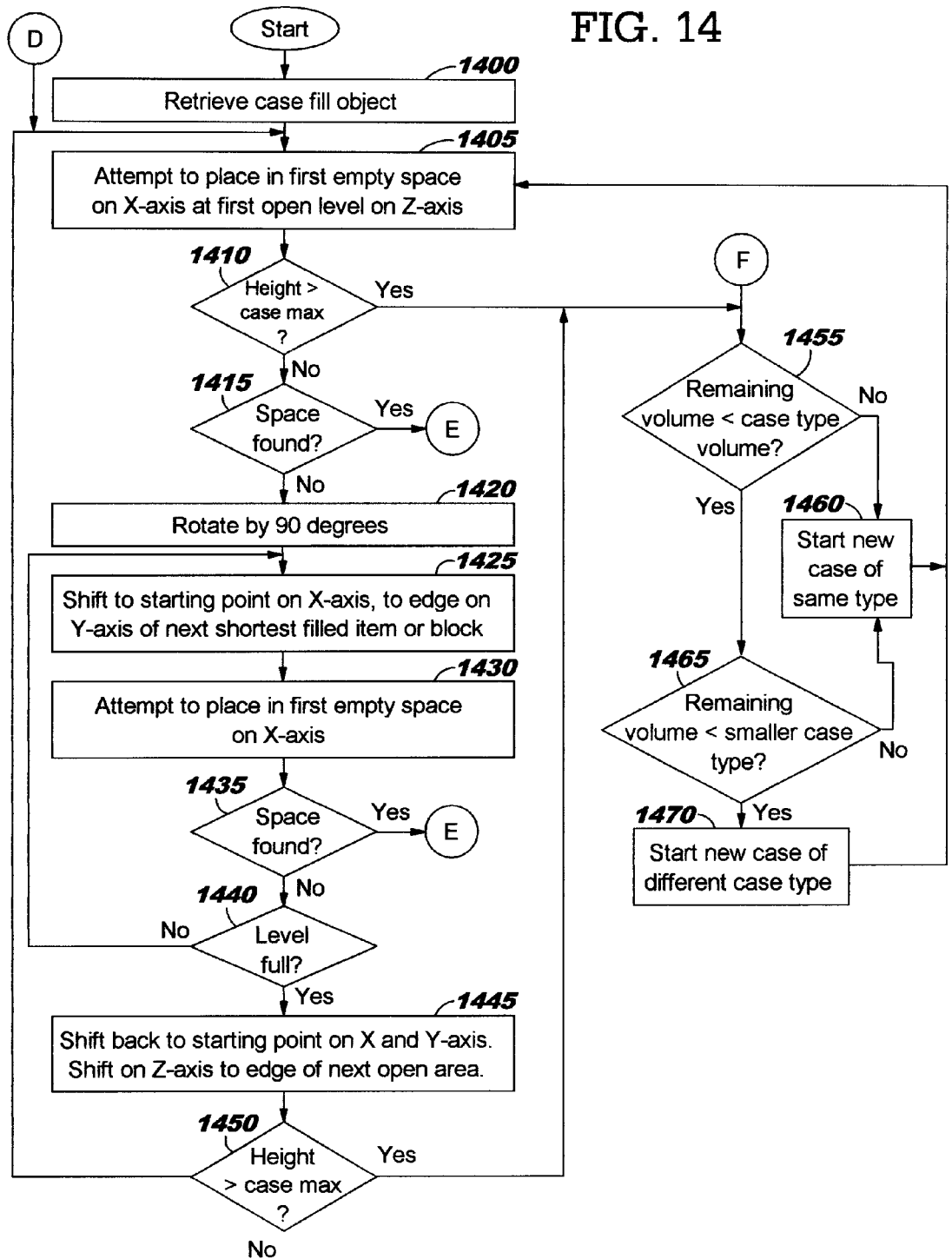

Block 1250 then executes a "place container in case" algorithm for the selected container group. This algorithm is illustrated in FIG. 14, as will now be described.

Block 1400 retrieves a case fill object corresponding to the container that is currently being evaluated for placement (e.g., by obtaining the container's corresponding row from case fill table 1100 or by obtaining an object that corresponds to the container and which contains information analogous to that depicted in FIG. 11). Block 1405 attempts to place the currently-evaluated container in the first empty space on the x-axis of the currently-evaluated case, at the first open level on the z-axis. Block 1410 then tests whether the height of the case after placing the container at this location would exceed the maximum height for the case (where the maximum height for this case type may be determined from column 1070 of case table 1000). If so, then this container cannot be placed in that location, and processing continues at Block 1455, which is discussed below. Otherwise, when the test at Block 1410 has a negative result, processing continues at Block 1415, which tests whether space was found at the attempted location. For example, even though the height may be within allowable bounds, it may happen that there is insufficient linear space for placing this container at the location attempted at Block 1405. If the test at Block 1415 has a positive result, then processing continues at Block 1500 of FIG. 15; otherwise, an iterative process of attempting to locate a different space for placing the container in the current case begins at Block 1420.

Block 1420 rotates the position of the container by 90 degrees. (Optionally, the container may be rotated in other dimensions if applicable, although this is not shown.) Block 1425 shifts the location back to the starting point on the x-axis, and shifts the location on the y-axis to the edge of the next-shortest filled item or block. Block 1430 then attempts to place the container in the first empty space on the x-axis. Block 1435 tests whether space was found in this attempt. If so, then processing continues at Block 1500 of FIG. 15 to record this location for this container in this case. Otherwise, when space was not found, Block 1440 tests whether the current level of the case is full. If it is not, then processing returns to Block 1425 to attempt finding a different location on this level of this case. If the current level is full, on the other hand (i.e., when the test at Bock 1440 has a positive result), then Block 1445 shifts back to the starting point on the x-axis and the y-axis, and shifts the container on the z-axis to the edge of the next open area. After performing the shifting at Block 1445, Block 1450 tests whether the height of the case after placing the container at this location would exceed the maximum height for the case (which may be determined from column 1070 of case table 1000). If so, then this case is full, and Blocks 1455-1470 then determine what type of new case should be started. On the other hand, when the test at Block 1450 has a negative result, then processing continues at Block 1405 to attempt finding a different location at a different level of this case.

When the current container cannot be placed in the current case, the new case selection begins at Block 1455 by testing whether the remaining volume of containers yet to be cased is less than the volume of the currently-evaluated case type. If so, then processing continues at Block 1465, which checks to see if there is a smaller case type that is big enough to hold the remaining volume of containers. If the test at Block 1465 has a positive result, then Block 1470 indicates that the next case to be started is of a different type than the just-filled case. In particular, the next case type is preferably selected as the smallest type having a volume larger than the remaining volume of containers. Following Block 1470, processing continues at Block 1405 to attempt finding a location for placing the container in the new case.

When the test at either of Blocks 1455 or 1465 has a negative result, processing continues at Block 1460 where the next case to be started is of the same type as the just-filled case. Following Block 1460, processing continues at Block 1405 to attempt finding a location for placing the container in the new case.

Figure 15:
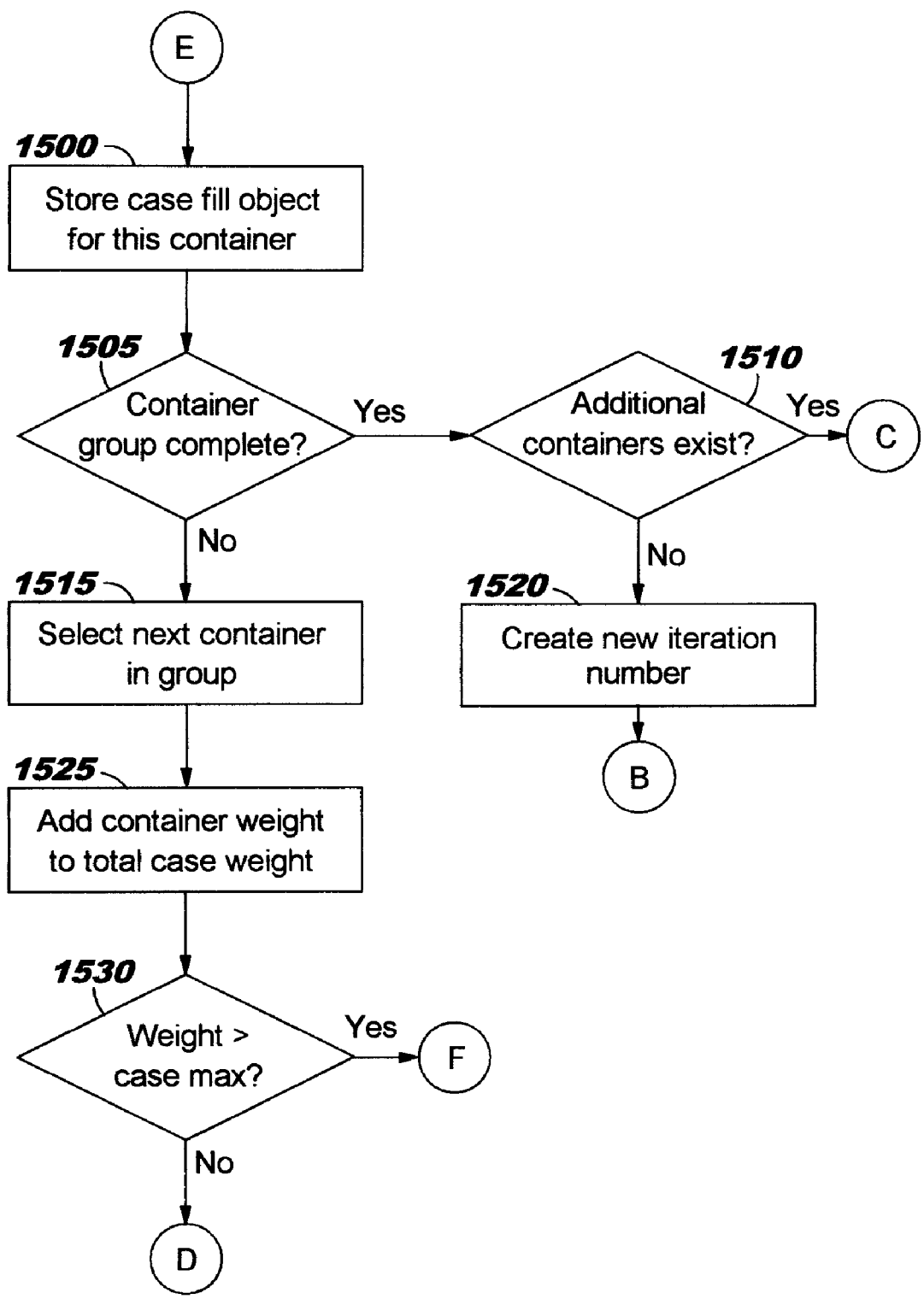

Referring next to FIG. 15, processing reaches Block 1500 when space for placing the container has been found in the current case. Block 1500 therefore updates the case fill object for this container. This preferably comprises inserting an identifier of the current case in column 1120, the 3-dimensional location within that case in column 1140, and an identifier of the case type at 1150.

Block 1505 tests whether processing for this container group is now complete. If so, then Block 1510 tests whether there are any other containers (i.e., containers that do not belong to the current container group) which are yet to be evaluated for casing. If not (i.e., when the test at Block 1510 has a negative result), then at Block 1520, a new iteration number is created (and inserted into column 1160 of a row in FIG. 11), after which processing continues at Block 835 of FIG. 8 (which determines whether there is another case type to be evaluated). When the test at Block 1510 has a positive result, on the other hand, then processing continues at Block 1205 of FIG. 12 to begin the processing for another group of containers.

Processing reaches Block 1515 when the test at Block 1505 has a negative result, indicating that the processing of the current container group is not yet complete. Accordingly, Block 1515 selects a next container in the group, and Block 1525 adds the weight of that selected container to the total weight being computed for the case currently being evaluated. Block 1530 tests whether the current weight for the case exceeds the case maximum for that case type (which may be found at column 1060 of case table 1000). If so, then this case is full, and processing continues at Block 1455 of FIG. 14 (which determines what type of new case should be started, as has been discussed earlier). If the test in Block 1530 has a negative result, then this case is not full, and processing continues at Block 1405 of FIG. 14, which begins an analysis for placing the current container in the current case, as has been described above.

Figure 16:
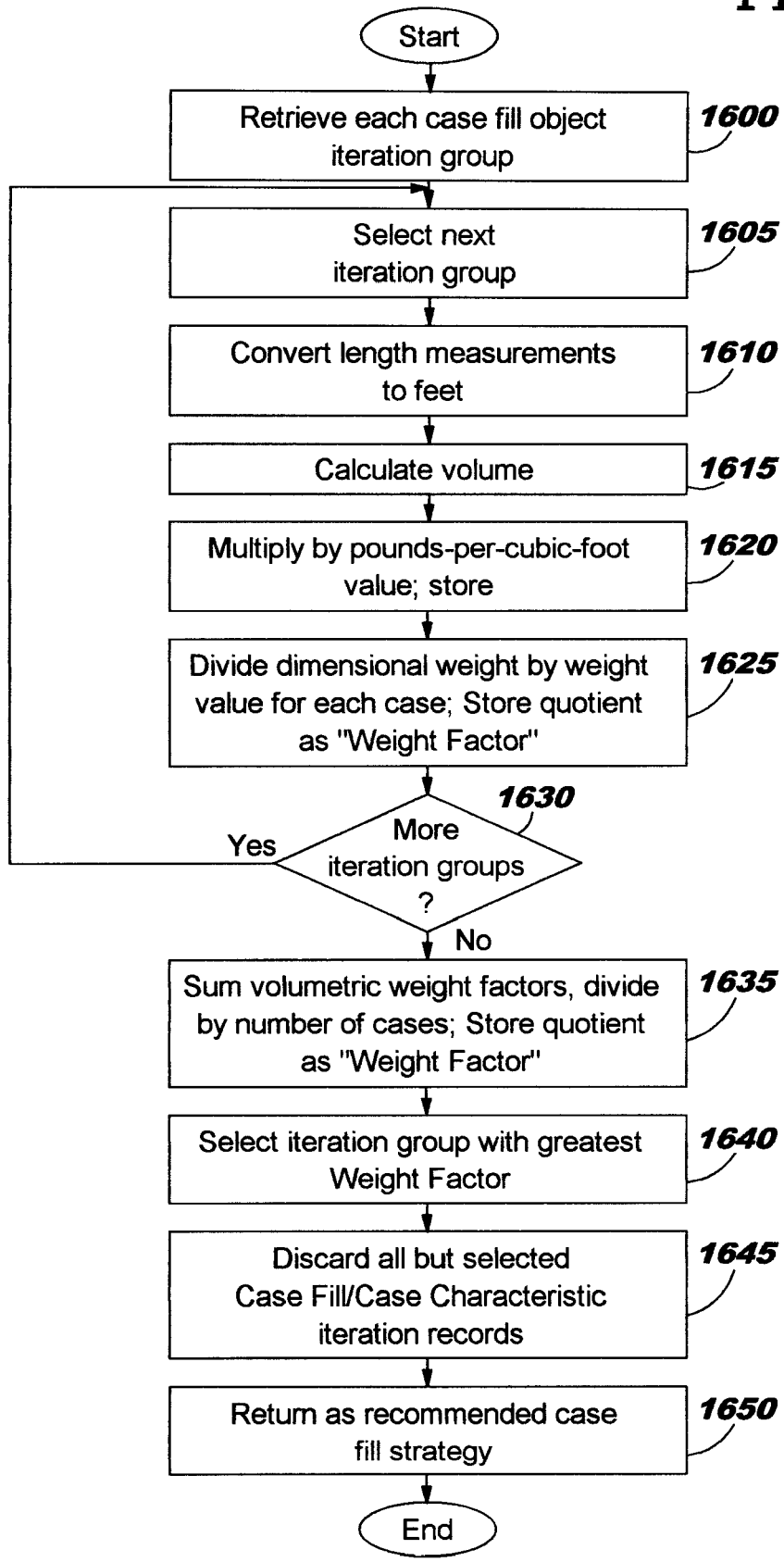
FIG. 16 provides a flowchart depicting logic which may be used when implementing a shipping cost optimization algorithm.

Referring now to FIG. 16, a flowchart is provided depicting logic which may be used when implementing a shipping cost optimization algorithm. Shipping carriers may charge a fixed base amount for a particular package size, with added charges if the actual weight of the package exceeds a predetermined weight. In this situation, if the weight of a particular package does not reach the predetermined weight, then the shipper of the items in the package is not making the most cost-effective use of the space in that package. A shipping carrier may charge based on the so-called "dimensional weight" for a package that is relatively large in volume but relatively light in weight. The shipping cost of a large box of already-popped popcorn, for example, might be based on the dimensional weight because of the amount of space the box takes on an aircraft or other shipping vehicle. By contrast, if a package has a relatively dense weight (which may be measured in terms of pounds per cubic foot), the shipping carrier may offer better rates to the shipper of the package. The logic in FIG. 16 is directed toward optimizing the actual weight of a package to incur charges based on the actual weight instead of on the dimensional weight, thereby reducing the overall fee; in addition, the shipping carrier may offer a preferred shipping rate that will further lower the fee.

Block 1600 retrieves each of the case fill object iteration groups for containers to be shipped to a particular destination. An iteration group comprises the rows from case fill table 1100 which represent containers to be cased in a single case, and which correspond to a particular iteration of the bulk casing processing (as represented by the iteration number in column 11160). Block 1605 selects a next one of these iteration groups, and Blocks 1610-1620 calculate the dimensional weight for the case type that is proposed for casing that iteration group. Calculating the dimensional weight, in this approach, comprises first converting the length measurements for the 3 dimensions of the case to feet (Block 1610). The case type may be determined from column 1150 of case fill table 1100, and the dimensions 1020, 1030, 1040 for that case type may then be obtained from case table 1000. The volume of this case type is then calculated (Block 1615) by multiplying the values from Block 1610 (or alternatively, may already be stored). Block 1620 then computes the dimensional weight using a pounds-per-cubic foot value, and stores that result as the dimensional weight for this iteration group. According to current international shipping standards, average density is 10.4 pounds per cubic foot. The pounds-per-cubic foot value used at Block 1620 may therefore be set to 10.4. Other approaches to determining dimensional weight may be used without deviating from the scope of the present invention.

Block 1625 then divides the dimensional weight from Block 1620 by the weight value for each case and stores the resulting quotient as a "weight factor" for this case. The weight value for a particular case may be obtained, for example, from the running total calculated during the bulk casing analysis (e.g., from the additions performed at Blocks 1215 and 1525) or by summing the weights of the individual containers that are to be cased therein.

Block 1630 then tests whether there are more iteration groups to be evaluated for this destination. If so, then processing continues at Block 1605 to select the next such group for evaluation. Otherwise, processing continues at Block 1635. Blocks 1635-1650 are directed toward selecting a "best fill" strategy for a particular case. Block 1635 therefore performs processing for each of the iteration groups that comprises summing the previously-stored weight factor for each case in this iteration group, dividing that value by the total number of cases in this iteration group, and then storing the resulting quotient as the weight factor for this iteration group. Block 1640 selects the iteration group having the greatest weight factor (as determined by the computations at Block 1635). Block 1645 then discards, from the case fill table 1100, all of the rows except those of the selected iteration group. Block 1650 then returns, as output of the shipping cost optimization algorithm, a set of case fill records reflecting the remaining contents of case fill table 1100 (that is, the records that indicate which case was selected for the iteration group having the greatest weight factor) and a set of case characteristics reflecting the best case types to use for bulk casing of the containers to be shipped to this destination. Refer to table 1700 of FIG. 17, which illustrates a sample case characteristics table that may be used for this purpose (e.g., indicating whether to use a small pallet or a large pallet and so forth). The processing of FIG. 16 then exits.

Although not shown in FIG. 16, an embodiment of the present invention may be adapted for performing cost-savings analysis due to execution of the shipping cost optimization algorithm. For example, the computed dimensional weights may be used to determine a shipping cost that would be incurred without use of the shipping cost optimization algorithm, and the actual costs may then be subtracted therefrom to determine the resulting cost benefit.

Figure 18:
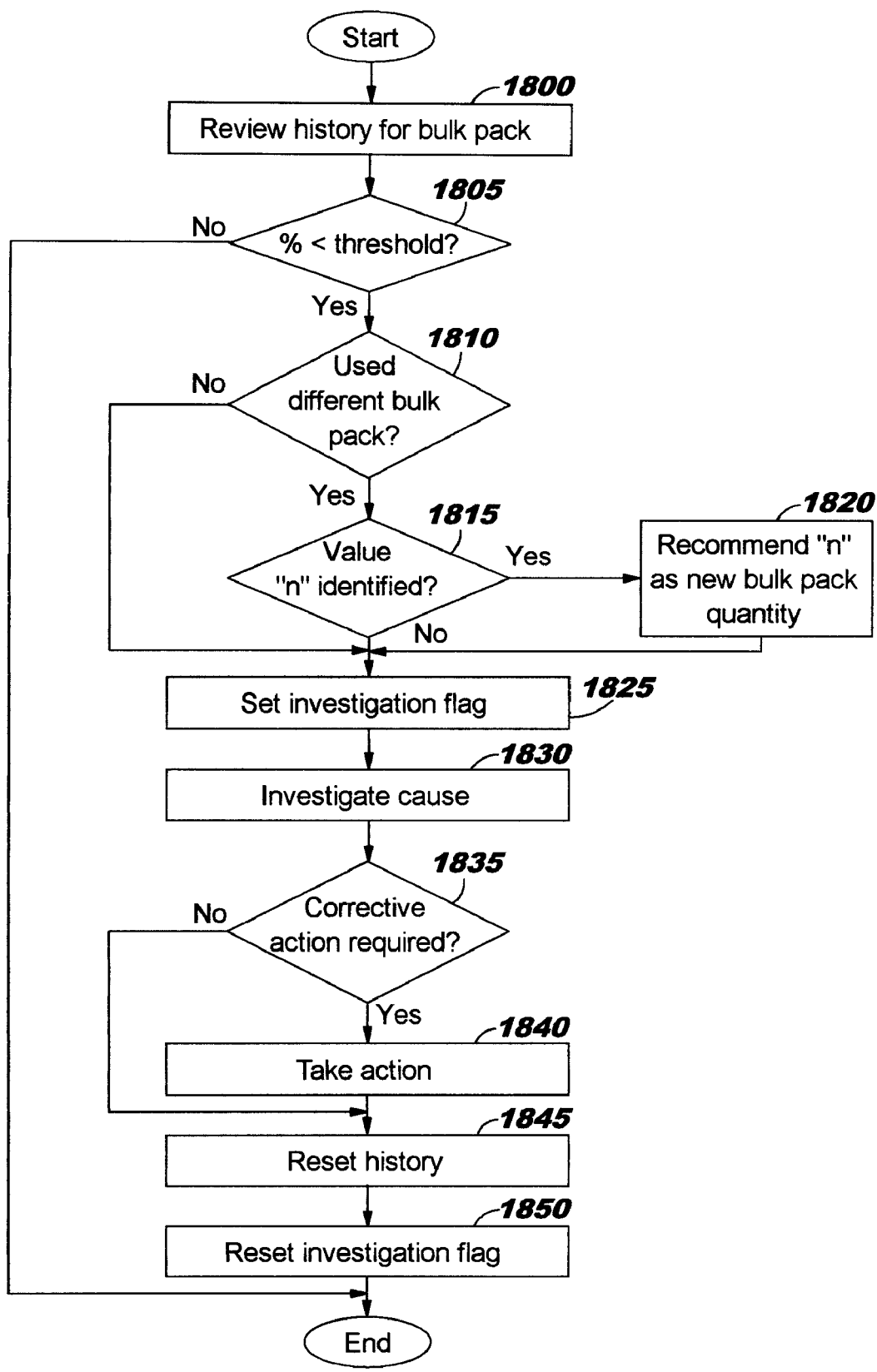
FIGS. 18 and 19 provide flowcharts depicting logic that may be used when implementing an optional aspect whereby statistics are gathered and analyzed for the packaging recommendations.
Figure 19:
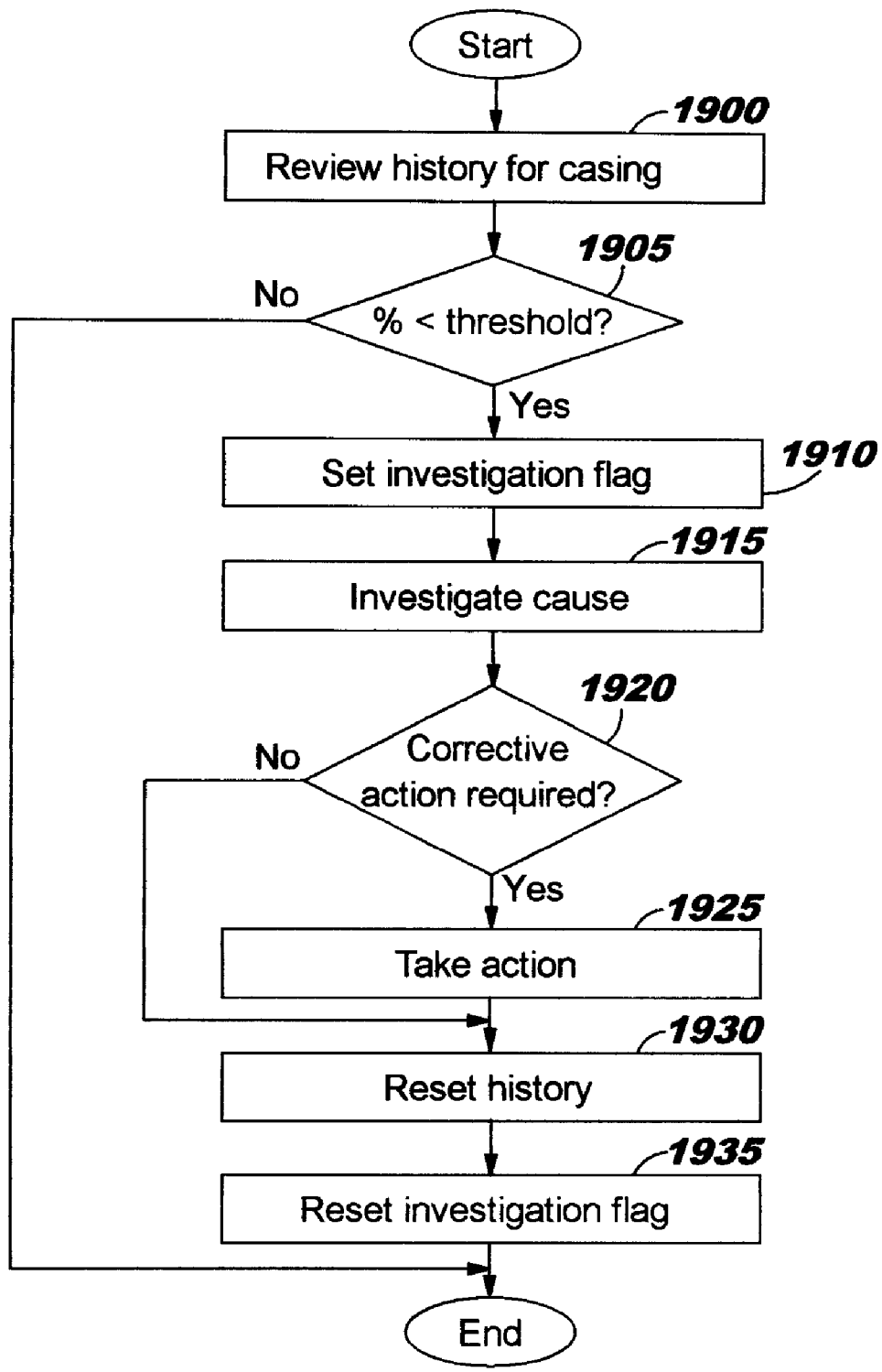

FIGS. 18 and 19 provide flowcharts depicting logic that may be used when implementing an optional aspect whereby statistics are gathered and analyzed for the packaging decisions. As noted above with respect to Blocks 330-335 of FIG. 3 and Blocks 730-735 of FIG. 7, the operator may be allowed to override the bulk pack and/or bulk casing recommendations, and if so, information is preferably recorded as a deviation in a history file.

FIG. 18 provides logic representing analysis of bulk pack decisions. This history is reviewed (Block 1800). For example, information stored in column 290 of table 200 (see FIG. 2) may be reviewed, where this information comprises a running percentage of how often a particular type of product was bulk packed according to the bulk pack recommendation. Block 1805 tests whether this percentage is less than a predetermined threshold. If not, then the bulk pack recommendations are being followed fairly well, and the processing of FIG. 18 exits. Otherwise (i.e., when the test at Block 1805 has a positive result), processing continues at Block 1810, which tests whether the type of deviation observed is use of a bulk pack strategy that is different from the recommended bulk pack strategy. If not (i.e., when the test at Block 1810 has a negative result), then it may be presumed that the deviation is due to not performing bulk packing when it was recommended, and processing continues at Block 1825 (which is discussed below).

When the test at Block 1810 has a positive result, indicating use of a different-than-recommended bulk pack strategy, Block 1815 tests whether the variance appears to be due to using some particular value "n" as the overriding quantity for bulk packing more often than some configured threshold percentage of the time. If the test at Block 1815 has a positive result, this indicates that this value "n" appears to be a better quantity for use in bulk packing this product type, and Block 1820 therefore recommends this value "n" as the new bulk pack quantity.

When the test at either of Blocks 1810 and 1815 has a negative result, and following completion of Block 1820, processing then reaches Block 1825, which sets an investigation flag. A user investigation is then preferably carried out (Block 1830). Preferably, this investigation considers at least one of the following causes when the deviation is due to use of a different-than-expected bulk pack strategy: recommended bulk pack quantity was incorrect; lower limit quantity was incorrect; and any other causes. When the deviation is due to not using bulk packing, the investigation preferably considers at least one of the following causes: units completing too far apart in time; units not completing on time, such that the destination received a split shipment; not enough space to hold units awaiting bulk pack; and any other causes.

Block 1835 tests whether corrective action is required following the investigation. If so, then action is taken (Block 1840). In either case, Block 1845 preferably resets the history (for example, by clearing the value in column 290 of table 200) and Block 1850 preferably resets the investigation flag. The processing of FIG. 18 then exits.

FIG. 19 provides logic representing analysis of bulk casing decisions. This history is reviewed (Block 1900). For example, information stored in column 295 of table 200 (see FIG. 2) may be reviewed, where this information comprises a running percentage of how often a particular type of container was bulk cased according to the bulk casing recommendation. In an alternative approach, a separate table may be used for storing bulk casing information, and the information depicted in column 295 of table 200 may be stored in that table.

Block 1905 tests whether the percentage value from column 295 of table 200 is less than a predetermined threshold. If not, then the bulk casing recommendations are being followed fairly well, and the processing of FIG. 19 exits. Otherwise (i.e., when the test at Block 1905 has a positive result), processing continues at Block 1910, which sets an investigation flag. A user investigation is then preferably carried out (Block 1915). Preferably, this investigation considers at least one of the following causes when the deviation is due to use of a different-than-expected bulk case strategy: quantity per case was incorrect; case filling algorithm not providing realistic results; input box (which may be a container or a case) dimensions incorrect; and any other causes. When the deviation is due to not using bulk casing, the investigation preferably considers at least one of the following causes: units completing too far apart in time; units not completing on time, such that the destination received a split shipment; not enough space to hold containers awaiting bulk casing; and any other causes.

Block 1920 tests whether corrective action is required following the investigation. If so, then action is taken (Block 1925). In either case, Block 1930 preferably resets the history (for example, by clearing the value in column 295 of table 200) and Block 1935 preferably resets the investigation flag. The processing of FIG. 19 then exits.

As will be appreciated by one of skill in the art, embodiments of the present invention may be provided as (for example) methods, systems, and/or computer program products. The invention can take the form of an entirely hardware embodiment, an entirely software embodiment, or an embodiment containing both hardware and software elements. In a preferred embodiment, the invention is implemented in software, which includes (but is not limited to) firmware, resident software, microcode, etc. Furthermore, the present invention may take the form of a computer program product which is embodied on one or more computer-usable storage media (including, but not limited to, disk storage, CD-ROM, optical storage, and so forth) having computer-usable program code embodied therein, where this computer program product may be used by or in connection with a computer or any instruction execution system. For purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory ("RAM"), a read-only memory ("ROM"), a rigid magnetic disk, and an optical disk. Current examples of optical disks include compact disk read-only memory ("CD-ROM"), compact disk read/write ("CD-R/W"), and DVD.

Figure 20:
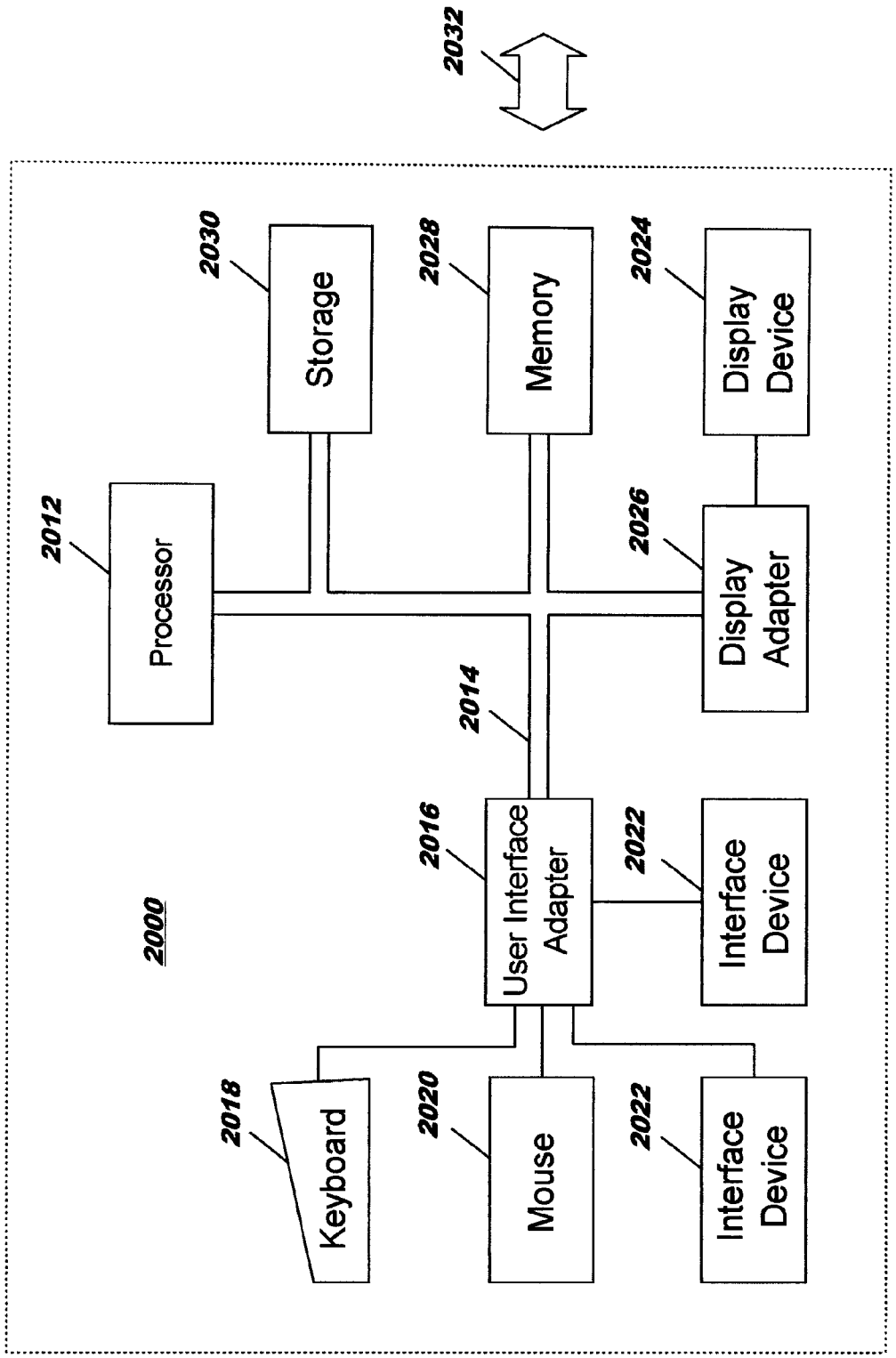
FIG. 20 depicts a data processing system suitable for storing and/or executing program code.

Referring now to FIG. 20, a data processing system 2000 suitable for storing and/or executing program code includes at least one processor 2012 coupled directly or indirectly to memory elements through a system bus 2014. The memory elements can include local memory 2028 employed during actual execution of the program code, bulk storage 2030, and cache memories (not shown) which provide temporary storage of at least some program code in order to reduce the number of times code must be retrieved from bulk storage during execution.

Input/output ("I/O") devices (including but not limited to keyboards 2018, displays 2024, pointing devices 2020, other interface devices 2022, etc.) can be coupled to the system either directly or through intervening I/O controllers or adapters (2016, 2026).

Network adapters may also be coupled to the system to enable the data processing system to become coupled to other data processing systems or remote printers or storage devices through intervening private or public networks (as shown generally at 2032). Modems, cable modem attachments, wireless adapters, and Ethernet cards are just a few of the currently-available types of network adapters.

Figure 21:
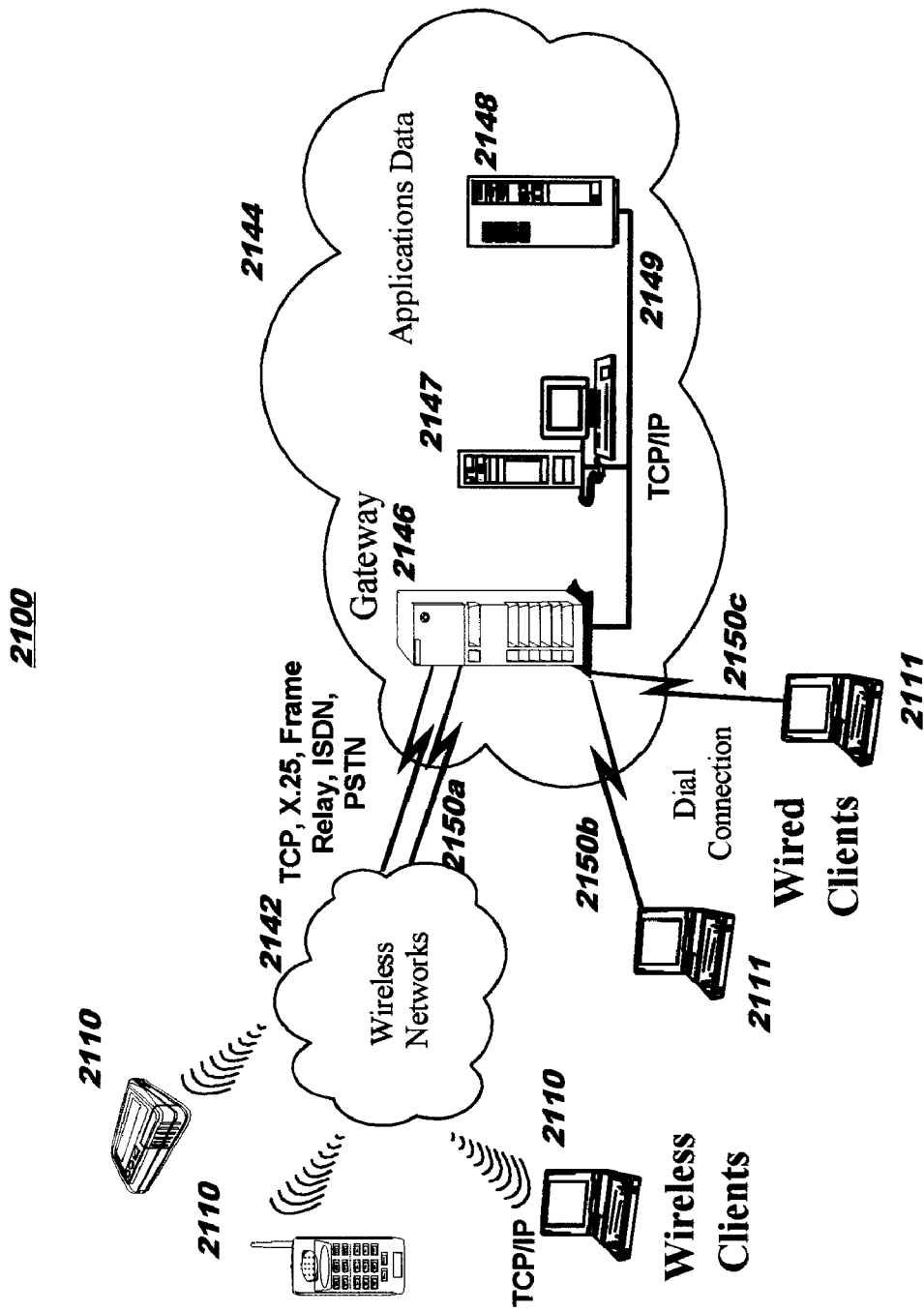
FIG. 21 depicts a representative networking environment in which one or more embodiments of the present invention may be used.

FIG. 21 illustrates a data processing network environment 2100 in which the present invention may be practiced. The data processing network 2100 may include a plurality of individual networks, such as wireless network 2142 and wired network 2144. A plurality of wireless devices 2110 may communicate over wireless network 2142, and a plurality of wired devices, shown in the figure (by way of illustration) as workstations 2111, may communicate over wired network 2144. Additionally, as those skilled in the art will appreciate, one or more local area networks ("LANs") may be included (not shown), where a LAN may comprise a plurality of devices coupled to a host processor.

Still referring to FIG. 21, the networks 2142 and 2144 may also include mainframe computers or servers, such as a gateway computer 2146 or application server 2147 (which may access a data repository 2148). A gateway computer 2146 serves as a point of entry into each network, such as network 2144. The gateway 2146 may be preferably coupled to another network 2142 by means of a communications link 2150a. The gateway 2146 may also be directly coupled to one or more workstations 2111 using a communications link 2150b, 2150c, and/or may be indirectly coupled to such devices. The gateway computer 2146 may be implemented utilizing an Enterprise Systems Architecture/390® computer available from IBM. Depending on the application, a midrange computer, such as an Application System/400® (also known as an AS/400®), iSeries®, System i™, and so forth may be employed. ("Enterprise Systems Architecture/390", "Application System/400", "AS/400", and "iSeries" are registered trademarks of IBM in the United States, other countries, or both, and "System i" is a trademark of IBM.)

The gateway computer 2146 may also be coupled 2149 to a storage device (such as data repository 2148).

Those skilled in the art will appreciate that the gateway computer 2146 may be located a great geographic distance from the network 2142, and similarly, the wireless devices 2110 and/or workstations 2111 may be located some distance from the networks 2142 and 2144, respectively. For example, the network 2142 may be located in California, while the gateway 2146 may be located in Texas, and one or more of the workstations 2111 may be located in Florida. The wireless devices 2110 may connect to the wireless network 2142 using a networking protocol such as the Transmission Control Protocol/Internet Protocol ("TCP/IP") over a number of alternative connection media, such as cellular phone, radio frequency networks, satellite networks, etc. The wireless network 2142 preferably connects to the gateway 2146 using a network connection 2150a such as TCP or User Datagram Protocol ("UDP") over IP, X.25, Frame Relay, Integrated Services Digital Network ("ISDN"), Public Switched Telephone Network ("PSTN"), etc. The workstations 2111 may connect directly to the gateway 2146 using dial connections 2150b or 2150c. Further, the wireless network 2142 and network 2144 may connect to one or more other networks (not shown), in an analogous manner to that depicted in FIG. 21.

The present invention has been described with reference to flow diagrams and/or block diagrams according to embodiments of the invention. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flow diagram flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flow diagram flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flow diagram flow or flows and/or block diagram block or blocks.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method for dynamically determining a bulk packing strategy for packing a plurality of items for shipment, comprising:

dynamically determining, using a processor of a computer, a plurality of items which are available for shipment;

determining, using the processor of the computer, an item type for each of the available items;

using each distinct item type to consult updateable stored information associated therewith, using the processor of the computer, the updateable stored information specifying whether items of that item type are candidates for bulk packing and, for each item type that is a candidate for bulk packing, a first quantity that indicates how many of the items of that item type to pack in a full bulk pack and a second quantity that indicates a lower limit on how many of the items of that item type to pack in a partial bulk pack;

using the first quantity and the second quantity to determine, using the processor of the computer, for each of the item types for which the consulted information specifies that items of the item type are candidates for bulk packing, how many of the available items of the item type to pack in full bulk packs, how many of the available items of the item type to pack in partial bulk packs, and determining to pack any remaining quantity of the available items of the item type as single packs; and determining, using the processor of the computer, to pack as single packs any of the available items for which the consulted information associated with the item type of the available item specifies that items of the item type are not candidates for bulk packing.

2. The computer-implemented method according to claim 1, wherein the updateable stored information specifying whether items of that item type are candidates for bulk packing comprises one of:

computer-processable rules for determining whether items of that item type are candidates for bulk packing; and a bulk pack enabled indicator associated with the item type, the bulk pack enabled indicator being selectively overridable by a customer override indicator.

3. The computer-implemented method according to claim 1, wherein using the first quantity and the second quantity further comprises:

calculating, for each of the item types for which the consulted information specifies that items of the item type are candidates for bulk packing, a quantity of the full bulk packs and the partial bulk packs to use for bulk packing the available items of that item type and the remaining quantity of the available items to pack as the single packs.

4. The computer-implemented method according to claim 1, wherein, for each of the item types for which the consulted information specifies that items of the item type are candidates for bulk packing, using the first quantity and the second quantity further comprises:

subtracting, from a total number of the available items of the item type, a number of the available items that are determined, using the first quantity, to be packed in full bulk packs;

responsive to a remainder of the subtraction being equal to or exceeding the second quantity, determining that a number of the available items equal to the remainder will be packed in the partial bulk packs; and responsive to the remainder being less that the second quantity, determining that the number of the available items equal to the remainder will be packed as the single packs.

5. The computer-implemented method according to claim 1, further comprising gathering statistics comprising how often the determined bulk packing strategy is followed for each of the item types.

6. The computer-implemented method according to claim 1, further comprising:

gathering statistics comprising how often the determined bulk packing strategy is followed; and using the gathered statistics for tuning the updateable stored information, wherein the tuning further comprises updating, for at least one of the item types, at least one of the first quantity and the second quantity when the gathered statistics indicate that the determined bulk packing strategy is being followed for bulk packing the available items of that item type less often than a predetermined threshold and that an alternate quantity is being used as a substitute for the first quantity or the second quantity when bulk packing the available items of that item type.

7. The computer-implemented method according to claim 1, further comprising:

dynamically determining a bulk casing strategy for casing containers into a plurality of cases for shipment, each of the containers holding a plurality of the bulk-packed items, further comprising:

using each distinct item type to consult the updateable stored information associated therewith, the updateable stored information further specifying whether containers used for bulk packing items of that item type are candidates for bulk casing; and recommending, as the bulk casing strategy, bulk casing for ones of the containers for which the consulted information specifies that the containers are candidates for bulk casing and single casing for ones of the containers for which the consulted information specifies that the containers are not candidates for bulk casing.

8. A system for dynamically determining a bulk packing strategy for packing a plurality of items for shipment, comprising:

a computer comprising a processor; and instructions executable using the processor to implement functions comprising:

dynamically determining a plurality of items which are available for shipment;

determining, for each of the available items, an item type;

using each distinct item type to consult updateable stored information associated therewith, the updateable stored information specifying whether items of that item type are candidates for bulk packing and, for each item type that is a candidate for bulk packing, a first quantity that indicates how many of the items of that item type to pack in a full bulk pack and a second quantity that indicates a lower limit on how many of the items of that item type to pack in a partial bulk pack;

using the first quantity and the second quantity to determine, for each of the item types for which the consulted information specifies that items of the item type are candidates for bulk packing, how many of the available items of the item type to pack in full bulk packs, how many of the available items of the item type to pack in partial bulk packs, and determining to pack any remaining quantity of the available items of the item type as single packs; and determining to pack, as single packs, any of the available items for which the consulted information associated with the item type of the available item specifies that items of the item type are not candidates for bulk packing.

9. A computer-readable storage medium embodying a computer program product for dynamically determining a bulk casing strategy for casing a plurality of containers for shipment, each of the containers containing at least one item and at least one of the containers containing at least two items, the computer program product comprising computer-readable program code which, when executed by a computer, performs:

dynamically determining the plurality of containers for shipment;

dynamically determining whether individual ones of the containers are candidates for bulk casing by consulting updateable stored information associated with an item type of each of the at least one item contained in each of the containers;

recommending, as the bulk casing strategy, bulk casing for those individual ones of the containers which are dynamically determined to be candidates for bulk casing and single casing for those individual ones of the containers which are dynamically determined not to be candidates for bulk casing;

for each of the plurality of case types, creating proposed case fill data indicating how cases of the case type can be filled with ones of the containers for which bulk casing is recommended, further comprising:

executing, for those individual ones of the containers which are determined to be candidates for bulk casing, a plurality of case fill algorithms to determine which of those individual ones of the containers to bulk case in each of the plurality of case types;

using the proposed case fill data created by executing each of the plurality of case fill algorithms as a separate potential bulk casing solution, wherein:

each of the potential bulk casing solutions identifies, for each of the individual ones of the containers which are determined to be candidates for bulk casing, a case into which that individual one can be cased;

each of the potential bulk casing solutions is different; and at least two of the individual ones are identified as being bulk cased together into a single one of the cases in at least one of the potential bulk casing solutions; and for each of the potential bulk casing solutions, performing:

computing a weight value for each of the cases identified in that potential bulk casing solution by summing a weight of each of the containers identified for casing into that case;

computing a weight factor for each of the cases identified in that potential bulk casing solution by dividing a dimensional weight of a case type of that case by the computed weight value of that case; and summing the computed weight factor for each of the cases identified in that potential bulk casing solution and dividing the sum by a count of the cases identified in that potential bulk casing solution to yield a weight factor of that potential bulk casing solution; and selecting, from the proposed case fill data, a preferred case fill for the bulk casing strategy, the preferred case fill indicating each of at least one of the plurality of case types to use for bulk casing each of the containers for which bulk casing is recommended, further comprising using results of executing the plurality of case fill algorithms to select the preferred case fill created by one of the executed case fill algorithms, further comprising selecting that one of the potential bulk casing solutions for which the weight factor of that potential bulk casing solution is greater than the weight factor of the non-selected ones of the potential bulk casing solutions.

10. The computer-readable medium according to claim 9, wherein the updateable stored information comprises one of:

Computer-processable rules for determining whether the at least one item contained in each of the containers is a candidate for bulk casing; and A bulk case enabled indicator associated with the item type of each of the items.

11. The computer-readable medium according to claim 9, wherein the updateable stored information comprises a bulk case enabled indicator associated with the item type of each of the items and a customer override indicator associated with the item type of each of the items and wherein the customer override indicator overrides the bulk case enabled indicator.

12. The computer-readable medium according to claim 9, wherein the computer program product further comprises computer-readable program code which, when executed by the computer, performs:

dynamically determining, for those individual ones of the containers which are dynamically determined to be candidates for bulk casing, whether enough of those containers are currently available for bulk casing; and wherein the recommending recommends, as the bulk casing strategy, bulk casing for those individual ones of the containers which are determined to be candidates for bulk casing only if enough of those containers are dynamically determined to be currently available for bulk casing and recommends single casing for those individual ones of the containers which are dynamically determined not to be candidates for bulk casing as well as for those individual ones of the containers which are determined to be candidates for bulk casing but for which enough of those containers are dynamically determined not be currently available for bulk casing.

13. The computer-readable medium according to claim 9, wherein creating the proposed case fill data further comprises, for at least one of the containers for which bulk casing is recommended, indicating how the at least one container can be bulk cased in at least two different ones of the plurality of case types.

14. The computer-readable medium according to claim 9, wherein:

at least one of the plurality of case fill algorithms is adapted for optimizing case fill by volume and density; and at least one of the plurality of case fill algorithms is adapted for optimizing case fill evenly across cases.

15. The computer-readable medium according to claim 9, wherein the computer program product further comprises computer-readable program code which, when executed by the computer, performs gathering statistics comprising how often the bulk casing strategy is followed for each of the item types of the at least one item contained in each of the containers.

16. The computer-readable medium according to claim 9, wherein the computer program product further comprises computer-readable program code which, when executed by the computer, performs:

dynamically determining a bulk packing strategy for packing a plurality of available items into at least one of the plurality of containers, further comprising:

dynamically determining the plurality of available items;

determining an item type for each of the available items;

using each distinct determined item type to consult the updateable stored information associated therewith, the updateable stored information specifying whether items of that item type are candidates for bulk packing; and recommending, as the bulk packing strategy, bulk packing into ones of the containers for those individual ones of the plurality of items which are dynamically determined to be candidates for bulk packing and single packing into different ones of the containers for those individual ones of the plurality of items which are dynamically determined not to be candidates for bulk packing.

* * * * *